US008767222B2

(12) United States Patent
Ito

(10) Patent No.: US 8,767,222 B2
(45) Date of Patent: Jul. 1, 2014

(54) PRINTING APPARATUS, CONTROL METHOD THEREFOR, AND STORAGE MEDIUM

(75) Inventor: Nobuyasu Ito, Yokohama (JP)

(73) Assignee: Canon Kabushiki Kaisha, Toyko (JP)

( * ) Notice: Subject to any disclaimer, the term of this patent is extended or adjusted under 35 U.S.C. 154(b) by 132 days.

(21) Appl. No.: 13/357,156

(22) Filed: Jan. 24, 2012

(65) Prior Publication Data

US 2012/0200872 A1 Aug. 9, 2012

(30) Foreign Application Priority Data

Feb. 8, 2011 (JP) ................................ 2011-025338
Nov. 28, 2011 (JP) ................................ 2011-259507

(51) Int. Cl.
*G06K 15/00* (2006.01)
*G06F 3/12* (2006.01)
*H04N 1/60* (2006.01)

(52) U.S. Cl.
USPC ......... 358/1.12; 358/1.14; 358/1.15; 358/1.9; 358/2.1

(58) Field of Classification Search
USPC ............... 358/1.12, 1.13, 1.15, 1.14, 2.1, 1.9, 358/474, 400, 401, 406, 437, 442, 468, 358/501–504; 713/300, 310, 320, 323, 502, 713/340; 399/44, 45, 398, 38, 46, 70, 391, 399/88–90; 347/102, 14, 17, 19, 57, 192, 347/193, 190
See application file for complete search history.

(56) References Cited

U.S. PATENT DOCUMENTS 6,072,585 A * 6/2000 Dutton et al. ................ 358/1.12
2003/0085513 A1 5/2003 Takahara et al.
2006/0023245 A1 * 2/2006 Sato et al. .................... 358/1.13

FOREIGN PATENT DOCUMENTS

CN 101013285 A 8/2007
JP 2005-132052 A 5/2005
JP 2008-180900 A 8/2008

OTHER PUBLICATIONS

Office Action issued on Mar. 4, 2014, in counterpart Chinese Application No. 201210030983.4.

* cited by examiner

*Primary Examiner* — Ngon Nguyen
(74) *Attorney, Agent, or Firm* — Carter, DeLuca, Farrell & Schmidt, LLP

(57) ABSTRACT

This invention provides a printing apparatus which controls power to be supplied to each connected apparatus in detail for each apparatus in accordance with the processing contents of a print job to be executed, and a control method therefor. To accomplish this, the printing apparatus analyzes the processing contents of a print job to be executed. In accordance with the analysis result, the printing apparatus controls at least one of a plurality of sheet feeding apparatuses which supplies a printing medium to the printing apparatus and a plurality of post-processing apparatuses which are receives a printing medium from the printing apparatus to shift to an active state in which normal power is supplied, a power saving state in which power necessary to convey a printing medium is supplied, or an inactive state in which no power is supplied.

8 Claims, 22 Drawing Sheets

FIG. 19

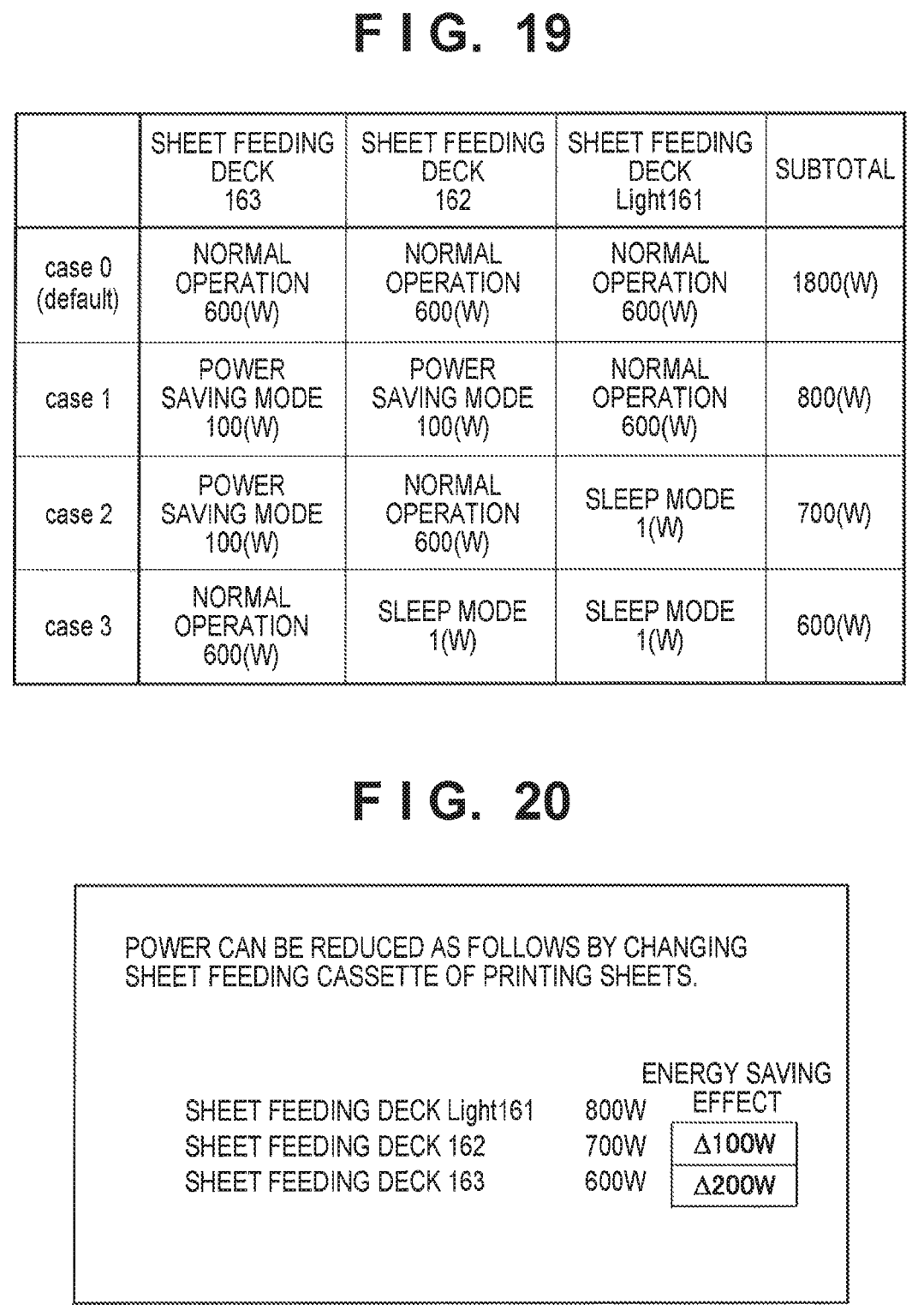

| | SHEET FEEDING DECK 163 | SHEET FEEDING DECK 162 | SHEET FEEDING DECK Light161 | SUBTOTAL |
|---|---|---|---|---|
| case 0 (default) | NORMAL OPERATION 600(W) | NORMAL OPERATION 600(W) | NORMAL OPERATION 600(W) | 1800(W) |
| case 1 | POWER SAVING MODE 100(W) | POWER SAVING MODE 100(W) | NORMAL OPERATION 600(W) | 800(W) |
| case 2 | POWER SAVING MODE 100(W) | NORMAL OPERATION 600(W) | SLEEP MODE 1(W) | 700(W) |
| case 3 | NORMAL OPERATION 600(W) | SLEEP MODE 1(W) | SLEEP MODE 1(W) | 600(W) |

FIG. 20

POWER CAN BE REDUCED AS FOLLOWS BY CHANGING SHEET FEEDING CASSETTE OF PRINTING SHEETS.

| | | ENERGY SAVING EFFECT |
|---|---|---|
| SHEET FEEDING DECK Light161 | 800W | |
| SHEET FEEDING DECK 162 | 700W | Δ100W |
| SHEET FEEDING DECK 163 | 600W | Δ200W |

FIG. 23C

803

| UNIT STATE | BEFORE MEASURE | AFTER MEASURE |
|---|---|---|
| POWER SAVING | 25 | 20 |
| ACTIVE (OFF) | 11 | 16 |
| INACTIVE (ON) | 18 | 18 |

PRINTING APPARATUS, CONTROL METHOD THEREFOR, AND STORAGE MEDIUM

BACKGROUND OF THE INVENTION

1. Field of the Invention

The present invention relates to a high-speed printing apparatus for printing a large volume of products requested in the POD market, a control method therefor, and a storage medium.

2. Description of the Related Art

There has conventionally been proposed a printing apparatus equipped with sheet feeding apparatuses in which a large volume of sheets are stacked, and post-processing apparatuses that execute post-processes such as booklet binding, covered binding, punching, trimming of sheet edges, and simple binding (Japanese Patent Laid-Open No. 2008-180900). Such a printing apparatus is mainly used as a POD (Print On Demand) apparatus. To increase the productivity of this printing apparatus, all the sheet feeding apparatuses and post-processing apparatuses generally operate in a normal power state.

Although a print job does not always use all apparatuses, the conventional printing apparatus does not always take an effective power saving measure. For example, a sheet feeding apparatus and post-processing apparatus need not operate in the normal power state depending on the position of a sheet feeding cassette for feeding a sheet or the type of post-processing to be executed. However, the conventional technique controls to turn on the power supplies of all apparatuses when the printing apparatus prints. The power consumption in an apparatus not used for a given print job increases more than necessary.

SUMMARY OF THE INVENTION

The present invention enables realization of a printing apparatus which controls power to be supplied to each connected apparatus in detail for each apparatus in accordance with the processing contents of a print job to be executed, a control method therefor and a storage medium.

One aspect of the present invention provides a printing apparatus, comprising: an analysis unit that analyzes a processing content of a print job to be executed; and a power supply control unit that controls, in accordance with an analysis result of the analysis unit, at least one of a plurality of sheet feeding apparatuses which supplies a printing medium to the printing apparatus and a plurality of post-processing apparatuses which, receives a printing medium from the printing apparatus to shift to an active state in which normal power is supplied, a power saving state in which power necessary to convey a printing medium is supplied, or an inactive state in which no power is supplied.

Another aspect of the present invention provides a method for controlling a printing apparatus, comprising; causing an analysis unit to analyze a processing content of a print job to be executed; and causing a power supply control unit to control, in accordance with an analysis result in the causing an analysis unit to analyze a processing content, at least one of a plurality of sheet feeding apparatuses which supplies a printing medium to the printing apparatus and a plurality of post-processing apparatuses which are receives a printing medium from the printing apparatus to shift to an active state in which normal power is supplied, a power saving state in which power necessary to convey a printing medium is supplied, or an inactive state in which no power is supplied.

Still another aspect of the present invention provides a computer-readable storage medium storing a computer program for causing a computer to execute each step in the printing apparatus control method.

Yet still another aspect of the present invention provides a printing apparatus capable of supplying a sheet to one of a plurality of post-processing apparatuses, comprising: an analysis unit that analyzes a processing content of a print job to be executed; and a power supply control unit that controls, in accordance with an analysis result of the analysis unit, at least one of the plurality of post-processing apparatuses to shift to an active state in which power necessary to perform post-processing for the sheet is supplied, a power saving state in which power necessary to convey the sheet without performing post-processing for the sheet is supplied, or an inactive state in which no power is supplied.

Still yet another aspect of the present invention provides a printing apparatus capable of receiving a sheet from a sheet feeding stage of one of a plurality of sheet feeding apparatuses, comprising: an analysis unit that analyzes a processing content of a print job to be executed; and a power supply control unit that controls, in accordance with an analysis result of the analysis unit, at least one of the plurality of sheet feeding apparatuses to shift to an active state in which power necessary to feed a sheet from the sheet feeding stage is supplied, a power saving state in which power necessary to convey the sheet without feeding a sheet from the sheet feeding stage is supplied, or an inactive state in which no power is supplied.

Further features of the present invention will be apparent from the following description of exemplary embodiments with reference to the attached drawings.

BRIEF DESCRIPTION OF THE DRAWINGS

FIG. 19 is a table exemplifying the electric energy in the third embodiment;

FIG. 20 is a view showing a power consumption difference in the third embodiment;

FIG. 23A to 23C are views showing the active state of a unit in the fourth embodiment.

DESCRIPTION OF THE EMBODIMENTS

Figure 1:
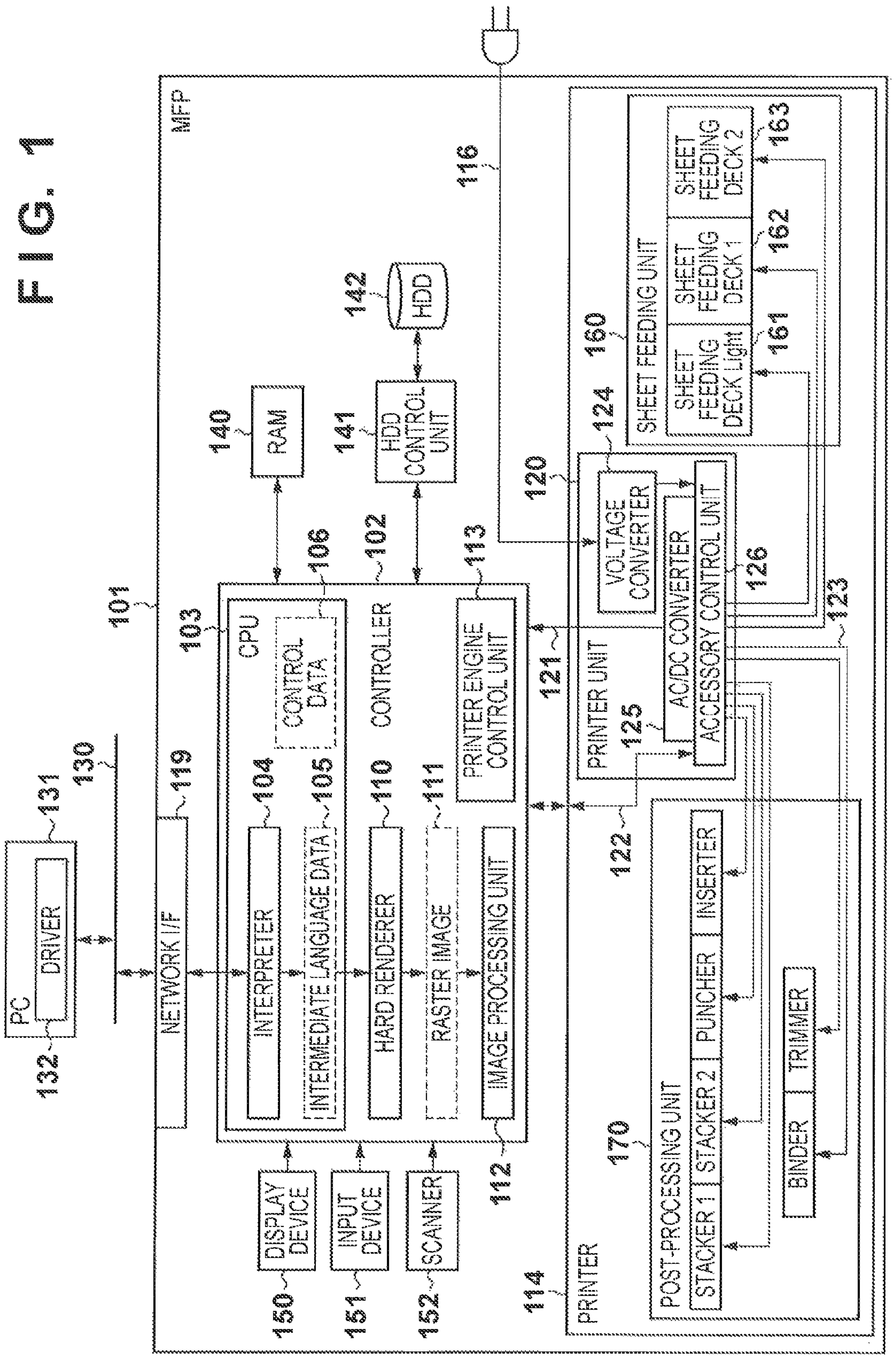
FIG. 1 is a block diagram showing the configuration of a system in the first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Printing System>

The first embodiment will be described below with reference to FIGS. 1 to 6. First, the configuration of a printing system in the present invention will be exemplified with reference to FIG. 1. An MFP (Multi Function Peripheral) 101 is an example of a printing apparatus including a controller 102 that generates an image, and a printer unit 120. The MFP 101 is connected to a PC 131 via a network such as a LAN 130. In addition to the controller 102 and printer unit 120, the MFP 101 includes a network I/F 119, display device 150, input device 151, scanner 152, RAM 140, HDD control unit 141, and HDD 142.

The network I/F 119 receives print data and the like generated by a printer driver 132 of the host PC 131. The controller 102 includes a CPU 103, hard renderer 110, image processing unit 112, and printer engine control unit 113. An interpreter 104 of the CPU 103 interprets the page description language (PDL) of the received print data, generating intermediate language data 105. The hard renderer 110 generates a raster image 111 from the generated intermediate language data 105. The image processing unit 112 performs image processing for the raster image 111 or an image scanned by the scanner 152. The printer engine control unit 113 receives a status from the printer unit 120 (to be described later), and issues commands such as activation and sheet conveyance. The BAM 140 is a memory used as the work area of the CPU 103. The HDD control unit 141 controls to store a document file and the raster image 111 in the HDD. The HDD 142 stores document data. Control data 106 is information about the sheet count, the size of paper (printing medium), the type of paper medium, and the settings of finishers used in post-processing steps, which are set by the user via the driver 132. The control data 106 is stored in the HDD 142, and can be read out from the HDD 142 by the CPU 103, as needed.

The printer unit 120 connected to the controller 102 is a printer which forms output data on a sheet using color toners of cyan, magenta, yellow, black, and the like. The printer unit 120 has a function of forming an image on a sheet, and can be connected to a sheet feeding unit 160 which feeds a sheet, and a post-processing unit 170 which performs a processing step (to be described later) for output sheets. A plurality of sheet feeding apparatuses can be connected as the sheet feeding unit 160 so that a POD printing apparatus can print using a large volume of sheets, and sheets of various sizes and types can be fed.

The printer unit 120 receives high-voltage power 116 via an AC power supply path (not shown) by a three-phase three-wire system or the like, and a converter 124 converts the voltage. An accessory control unit 126 performs ON/OFF control of a power supply line 123 for supplying power converted by the converter 124 to respective apparatuses (sheet feeding apparatuses and post-processing apparatuses) based on a control signal 122 from the controller 102. An AC/DC converter 125 reduces the voltage to a small value to drive the CPU 103 and the like, and generates DC power 121 to be supplied to the controller 102.

The post-processing unit 170 includes a binder which performs saddle stitching processing for printed sheets, a puncher which forms binding holes, an inserter which inserts a slip sheet, and a trimmer which trims sheet edges. A stacker is an apparatus for temporarily stacking printed sheets to perform a post-processing step by a dedicated offline apparatus (not shown). These post-processing apparatuses are series-connected to the MFP 101. In the example shown in FIG. 1, sheet feeding apparatuses are connected in the order of sheet feeding-deck Light, sheet feeding deck 1, and sheet feeding deck 2 from the vicinity of the MFP 101. Also, post-processing apparatuses are connected in the order of the inserter, stacker 2, stacker 1, puncher, binder, and trimmer from the vicinity of the MFP 101. The MFP 101 can feed a sheet from one of these sheet feeding apparatuses, print on the fed sheet by the printer unit 120, and supply the printed sheet to one of the post-processing apparatuses.

The display device 150 displays a user interface screen representing an instruction to the user and the status of the MFP 101. The scanner 152 is a scanner including an auto document feeder. The scanner 152 irradiates the images of a document bundle or the image of one document sheet with a light source (not shown), forms the document reflected image on a solid-state image sensor such as a CCD sensor via a lens, and obtains a raster image reading signal as image data from the solid-state image sensor. The input device 151 is an interface including key inputs and a touch panel for accepting an input from the user.

<Arrangement of Power Supply Control Unit>

Figure 2:
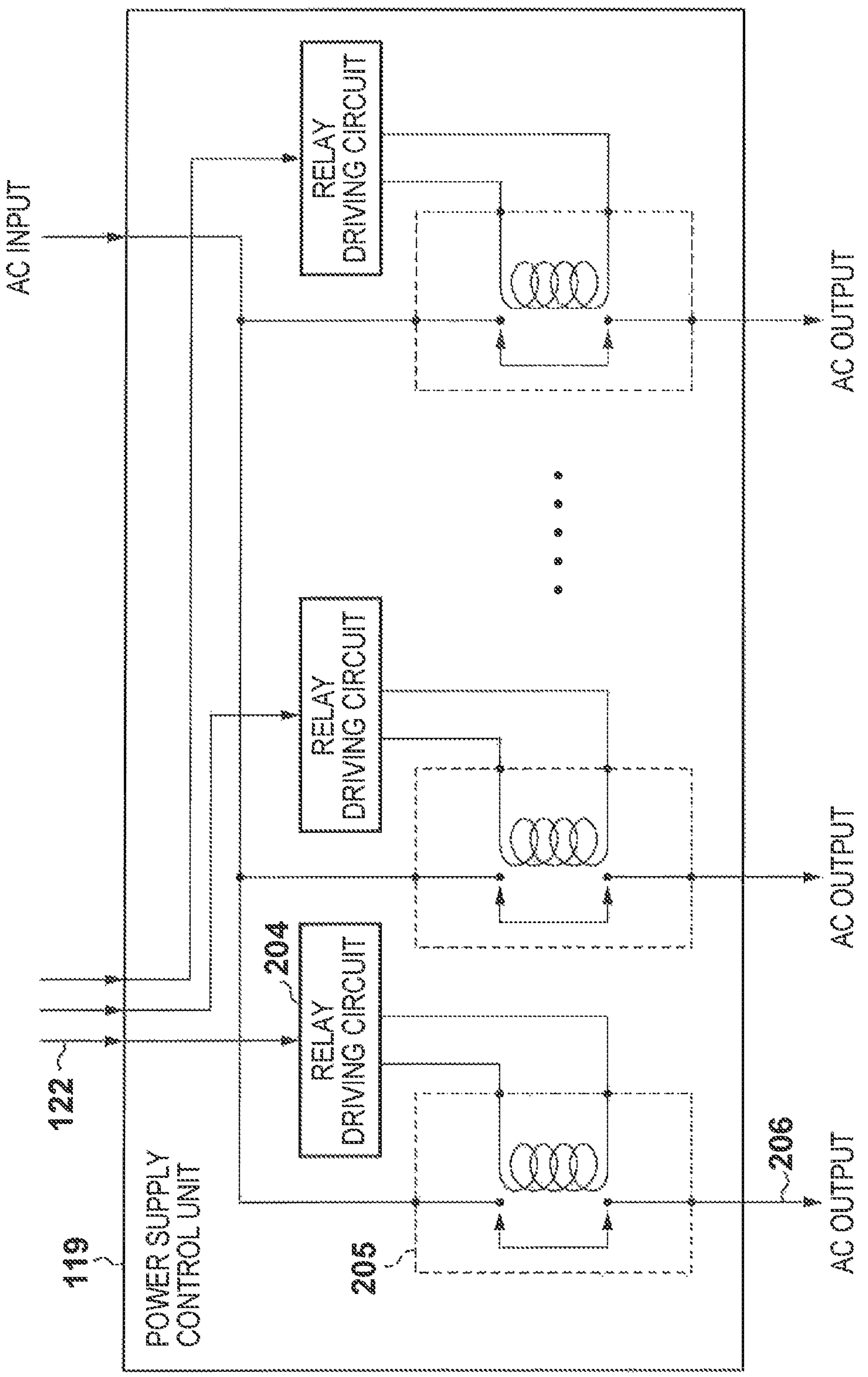
FIG. 2 is a diagram showing the arrangement of a unit in the first embodiment.

The arrangement of the accessory control unit 126 will be exemplified with reference to FIG. 2. The accessory control unit 126 receives the control signal 122 and an AC input from the converter 124, and outputs AC outputs to the power supply line 123 and the like. The accessory control unit 126 includes a relay 205 connected to an AC line, and a relay driving circuit 204 for it. The relay driving circuit 204 turns on/off the relay 205 in accordance with the control signal 122 output from the controller 102. When the relay 205 is turned on, the AC input and an AC output 206 are rendered conductive to supply power. When the relay 205 is turned off, the power supply path is cut off and no power is supplied to an AC output 206. As shown in FIG. 2, the accessory control unit 126 includes other relays for outputting power to a plurality of AC outputs, and relay driving circuits.

<Print Processing>

Figure 3:
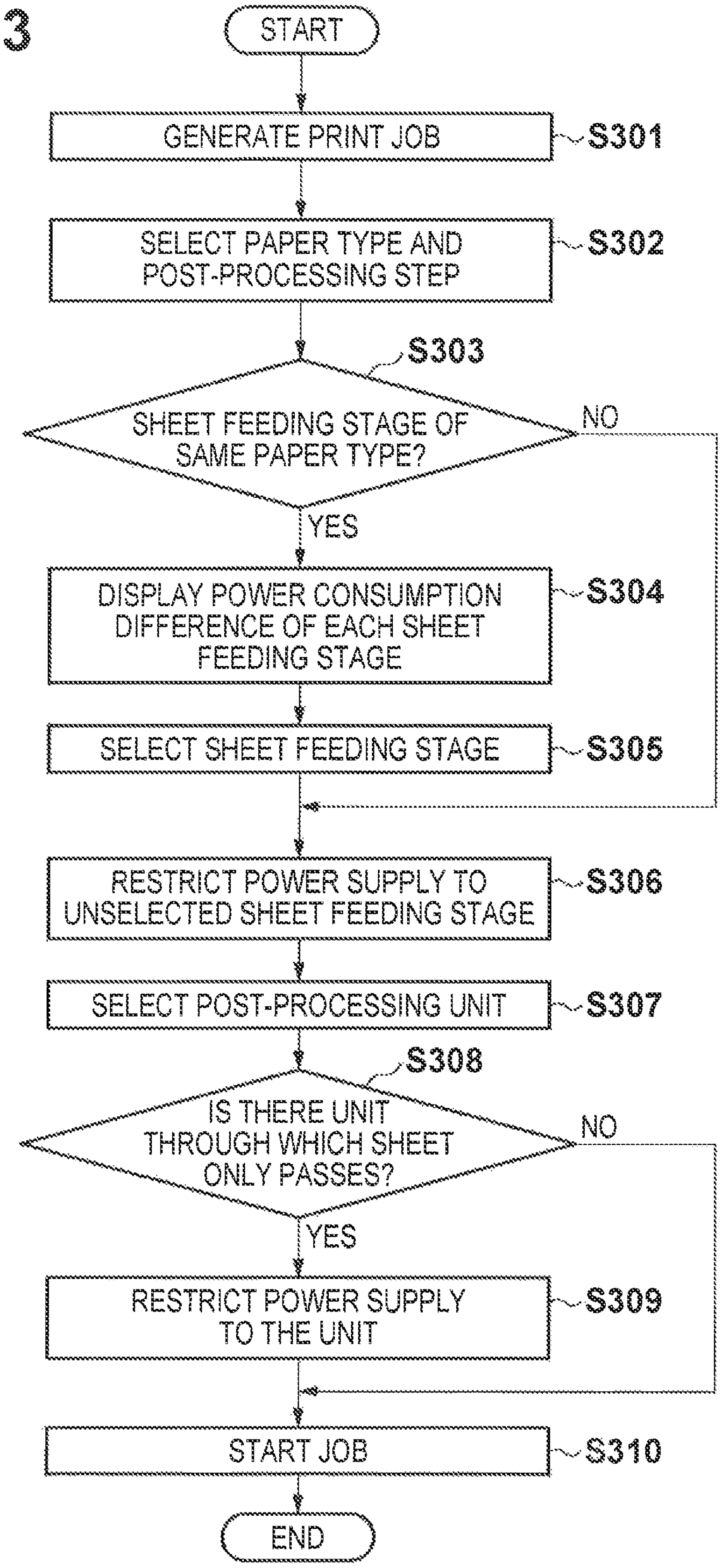
FIG. 3 is a flowchart showing a print job sequence in the first embodiment.

A sequence when the PC 131 executes print processing using the driver 132 in the system of the embodiment will be explained with reference to FIG. 3. Note that the following processing is performed by reading out a program stored in the HDD 142 to the RAM 140 and executing it by the controller 102 of the MFP 101.

When the driver 132 in the PC 131 transfers data, the controller 102 generates a print job in step S301. In step S302, the controller 102 analyzes the processing contents of the accepted print job, and selects a paper type used for printing (sheet feeding stage for feeding a sheet) and a post-processing step. In step S303, the controller 102 determines whether the sheet feeding unit 160 includes a sheet feeding apparatus including a sheet feeding stage on which sheets of the same paper type as that selected in step S302 are stacked. If there is a sheet feeding stage on which sheets of the same paper type as the selected one are stacked, the process advances to step S304. In step S304, the controller 102 assumes a case in which a sheet is fed from the sheet feeding stage and a case in which the sheet feeding stage is changed to feed a sheet from another one. The controller 102 predicts respective power consumptions after applying power saving control (to be described later), and presents difference values to the operator. As the presentation method, the display device 150 may display power consumptions when sheets are fed from respective sheet feeding stages, and the difference values between the power consumptions and a power consumption when a sheet is fed from a sheet feeding stage designated by a print job. In step S305, the controller 102 selects a sheet feeding stage in accordance with an instruction input from the operator via the input device 151 to change a sheet feeding stage for use.

If the controller 102 determines in step S303 that there is no sheet feeding stage set to store sheets of the same paper type as the selected one, the processes in steps S304 and S305 are skipped and the process advances to step S306. In step S306, based on the connection order of a plurality of sheet feeding apparatuses in the sheet feeding unit 160, the controller 102 restricts power supply to sheet feeding apparatuses except for a sheet feeding apparatus having the selected sheet feeding stage, thereby saving power. The restriction of power supply means controlling the operation state to shift to either a power saving state in which only power necessary to convey a sheet is supplied to each sheet feeding deck of the sheet feeding unit 160, or an inactive state in which no power is supplied. In addition to the power saving state and inactive state, the operation state includes an active state in which normal power is supplied.

For example, assume that sheet feeding from sheet feeding deck 2 farthest from the MFP 101 is selected when three sheet feeding decks are connected, as shown in FIG. 1. In this case, to convey the sheet to the MFP 101, motors for rotating the conveyance rollers of sheet feeding deck Light and sheet feeding deck 1 need to be driven. In this case, only power necessary to convey a sheet is supplied to sheet feeding deck Light and sheet feeding deck 1. When sheet feeding from sheet feeding deck Light closest to the MFP 101 is selected, only sheet feeding deck Light suffices to be operated to convey the sheet to the MFP 101. Hence, no power is supplied to sheet feeding deck 1 and sheet feeding deck 2. In other words, sheet feeding deck 1 and sheet feeding deck 2 become inactive.

In step S307, the controller 102 selects a post-processing apparatus for use in the post-processing unit 170 in accordance with post-processing designated by the print job. In step S308, the controller 102 determines whether there is a unit through which a sheet only passes. If there is a unit through which a sheet only passes, the process advances to step S309, and the controller 102 shifts the unit to the power saving state (to be described later) based on the connection order of a plurality of post-processing apparatuses in the post-processing unit 170. This processing is the same as that in step S306. More specifically, it is controlled for each of the post-processing apparatuses whether to supply normal power, to supply only power necessary to drive a motor for rotating a conveyance roller for conveying a sheet, or not to supply power. If the controller 102 determines in step S308 to use all functions included in the post-processing unit 170, it simply starts the job in step S310 without any processing.

<Arrangements of Sheet Feeding Unit and Post-Processing Unit>

Figure 4:
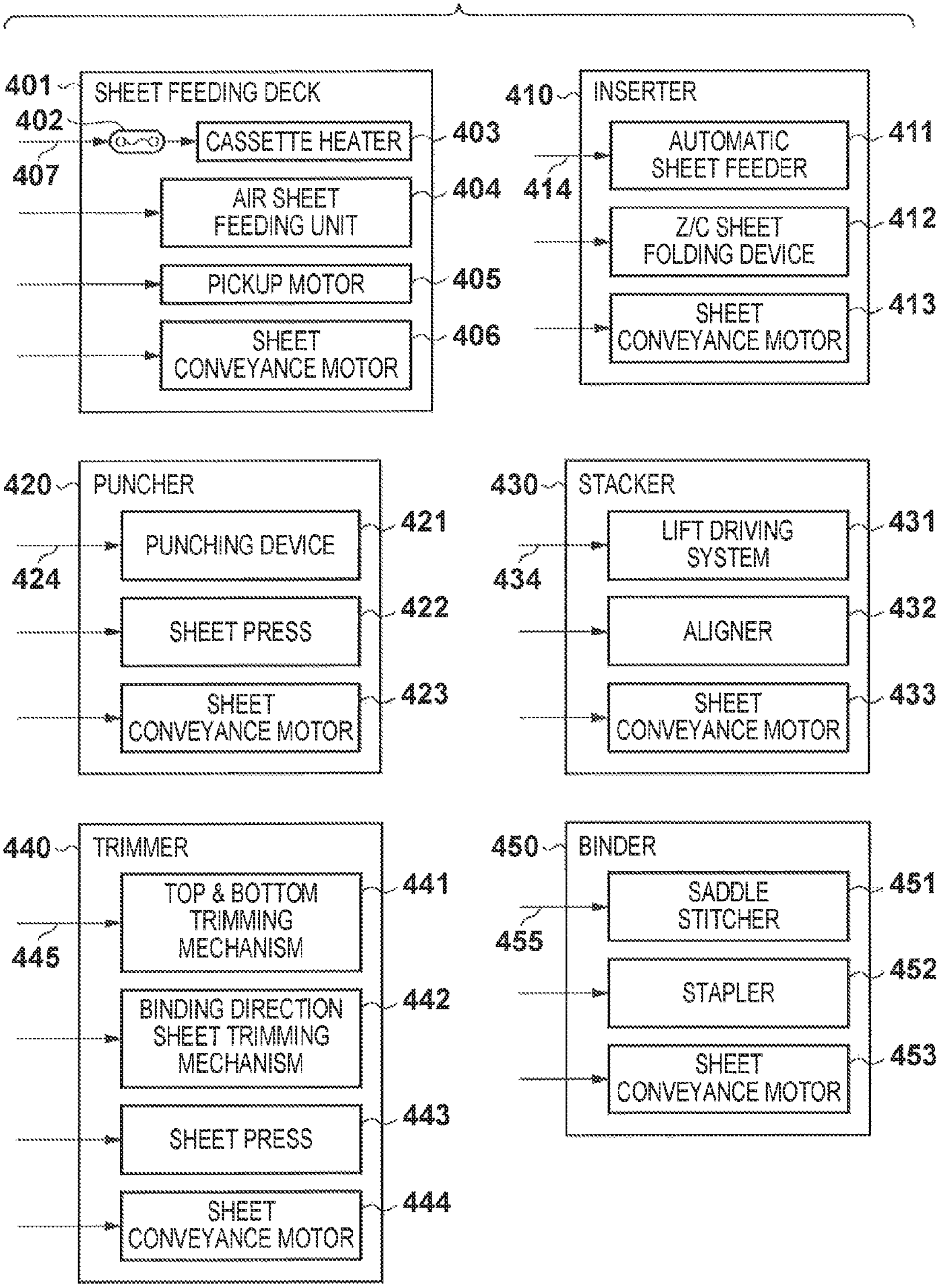
FIG. 4 is a block diagram showing the arrangements of units in the first embodiment.

The arrangement of each sheet feeding apparatus in the sheet feeding unit 160 and that of each post-processing apparatus in the post-processing unit 170 will be described with reference to FIG. 4. The sheet feeding unit 160 includes a sheet feeding deck 401, and a power supply system 407 extending from the accessory control unit 126 is connected to each unit in the sheet feeding deck 401. Four AC outputs 206 (cables) shown in FIG. 2 are connected to the sheet feeding deck 401. The accessory control unit 126 switches whether to supply power for each unit in accordance with an instruction from the controller 102. A cassette heater 403 warms a moisture-absorbing sheet to remove the moisture. Reference numeral 402 denotes a heater protection fuse. An air sheet feeding unit 404 feeds a sheet by air. A pickup motor 405 picks up sheets one by one from sheets stacked in volume. A sheet conveyance motor 406 conveys a sheet to a subsequent unit.

Reference numeral 410 denotes an inserter. A power supply system 414 extending from the accessory control unit 126 is connected to each unit in the inserter 410. Three AC outputs 206 (cables) shown in FIG. 2 are connected to the inserter 410. The accessory control unit 126 switches whether to supply power for each unit in accordance with an instruction from the controller 102. An automatic sheet feeder 411 allows setting a sheet to be inserted. A sheet folding device 412 folds a longitudinal sheet into the Z or C shape. A conveyance motor 413 conveys a sheet to a subsequent unit. A puncher 420 forms holes for filing. A power supply system 424 extending from the accessory control unit 126 is connected to each unit in the puncher 420. Three AC outputs 206 (cables) shown in FIG. 2 are connected to the puncher 420. The accessory control unit 126 switches whether to supply power for each unit in accordance with an instruction from the controller 102. Reference numeral 421 denotes a punching device. A press 422 presses a plurality of sheets in punching. A conveyance motor 423 conveys a sheet to a subsequent unit. A stacker 430 is used to stack printed products in order to process them by an offline post-processing apparatus (not shown in FIG. 1). A power supply system 434 extending from the accessory control unit 126 is connected to each unit in the stacker 430. Three AC outputs 206 (cables) shown in FIG. 2 are connected to the stacker 430. The accessory control unit 126 switches whether to supply power for each unit in accordance with an instruction from the controller 102. A lift driving system 431 moves up and down, a stacking tray. An aligner 432 aligns products in place. A conveyance motor 433 conveys a sheet to a subsequent unit.

Reference numeral 440 denotes a trimmer. A power supply system 445 extending from the accessory control unit 126 is connected to each unit in the trimmer 440. Four AC outputs 206 (cables) shown in FIG. 2 are connected to the trimmer 440. The accessory control unit 126 switches whether to supply power for each unit in accordance with an instruction from the controller 102. Reference numeral 441 denotes a top & bottom sheet trimming mechanism; and 442, a binding direction sheet trimming mechanism. A press 443 presses a plurality of sheets in trimming. A conveyance motor 444 conveys a sheet to a subsequent unit. Reference numeral 450 denotes a binder. A power supply system 455 extending from the accessory control unit 126 is connected to each unit in the binder 450. Three AC outputs 206 (cables) shown in FIG. 2 are connected to the binder 450. The accessory control unit 126 switches whether to supply power for each unit in accordance with an instruction from the controller 102. Reference numeral 451 denotes a saddle stitcher. A stapler 452 binds sheets with staples. A conveyance motor 453 conveys a sheet to a subsequent unit.

For example, when power supply is restricted in step S306 or S309 and the operation state is controlled to shift to the power saving state in which only power necessary to convey a sheet is supplied, a current is applied to only the sheet conveyance motor 406 without supplying power to the remaining units. When the operation state is controlled to shift to the inactive state in which no power is supplied, no power is supplied to, for example, all the units 411 to 413 in the inserter 410.

<Power Saving Control of Sheet Feeding Unit>

Figure 5:
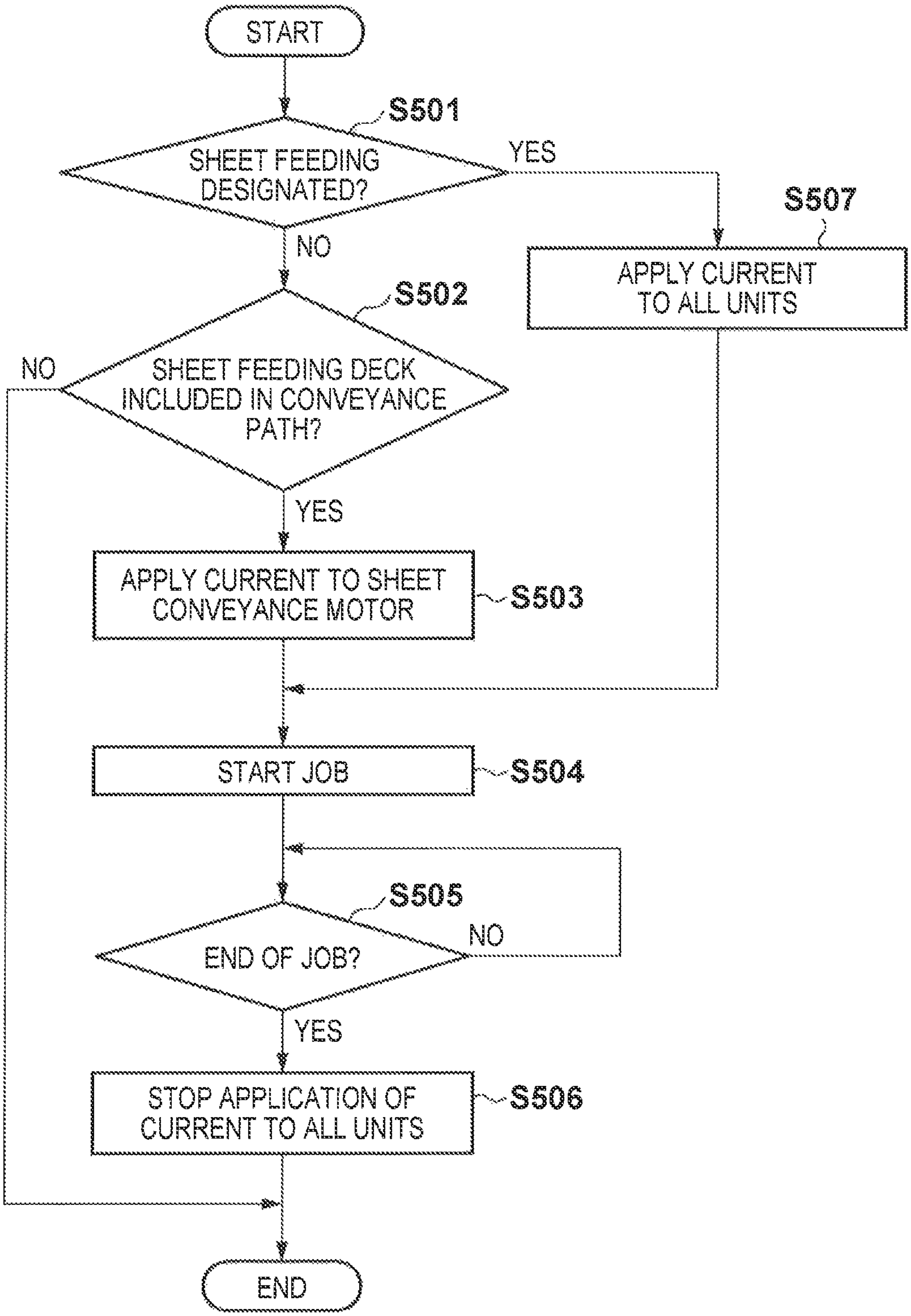
FIG. 5 is a flowchart showing a power saving sequence in the first embodiment.

Power saving control of the sheet feeding unit will be explained with reference to FIG. 5. Note that the following processing is performed by residing out a program stored in the HDD 142 to the RAM 140 and executing it by the controller 102. The controller 102 performs the processing shown in the flowchart of FIG. 5 for each sheet feeding apparatus.

In step S501, the controller 102 determines whether sheets of a paper type designated by a print job exist in the sheet feeding apparatus and the sheet feeding apparatus has been selected. If the sheet feeding apparatus has been selected, the process advances to step S507, and the controller 102 shifts the sheet feeding apparatus to the normal operation mode in which it is controlled to apply a current to all the units of the sheet feeding deck. The process then advances to step S504.

If the sheet feeding apparatus has not been selected, the process advances to step S502, and the controller 102 determines whether the sheet feeding apparatus exists midway along the conveyance path, that is, the conveyance path includes the sheet feeding deck. If the path includes the sheet feeding deck, the process advances to step S503, and the controller 102 controls the sheet feeding apparatus to shift to the power saving state in which it is controlled to apply a current to only the sheet conveyance motor of the sheet feeding apparatus. After that, the process advances to step S504.

In step S504, the controller 102 starts the job. In step S505, the controller 102 determines whether the job has ended, and executes sheet feeding or sheet conveyance processing until the job ends. After the job ends, the process advances to step S506, and the controller 102 controls to stop power supply to all the current-applied units, shifts the sheet feeding apparatus to the inactive mode, and ends the process.

The controller 102 repeats this processing for each sheet feeding apparatus.

<Power Saving Control of Post-Processing Unit>

Figure 6:
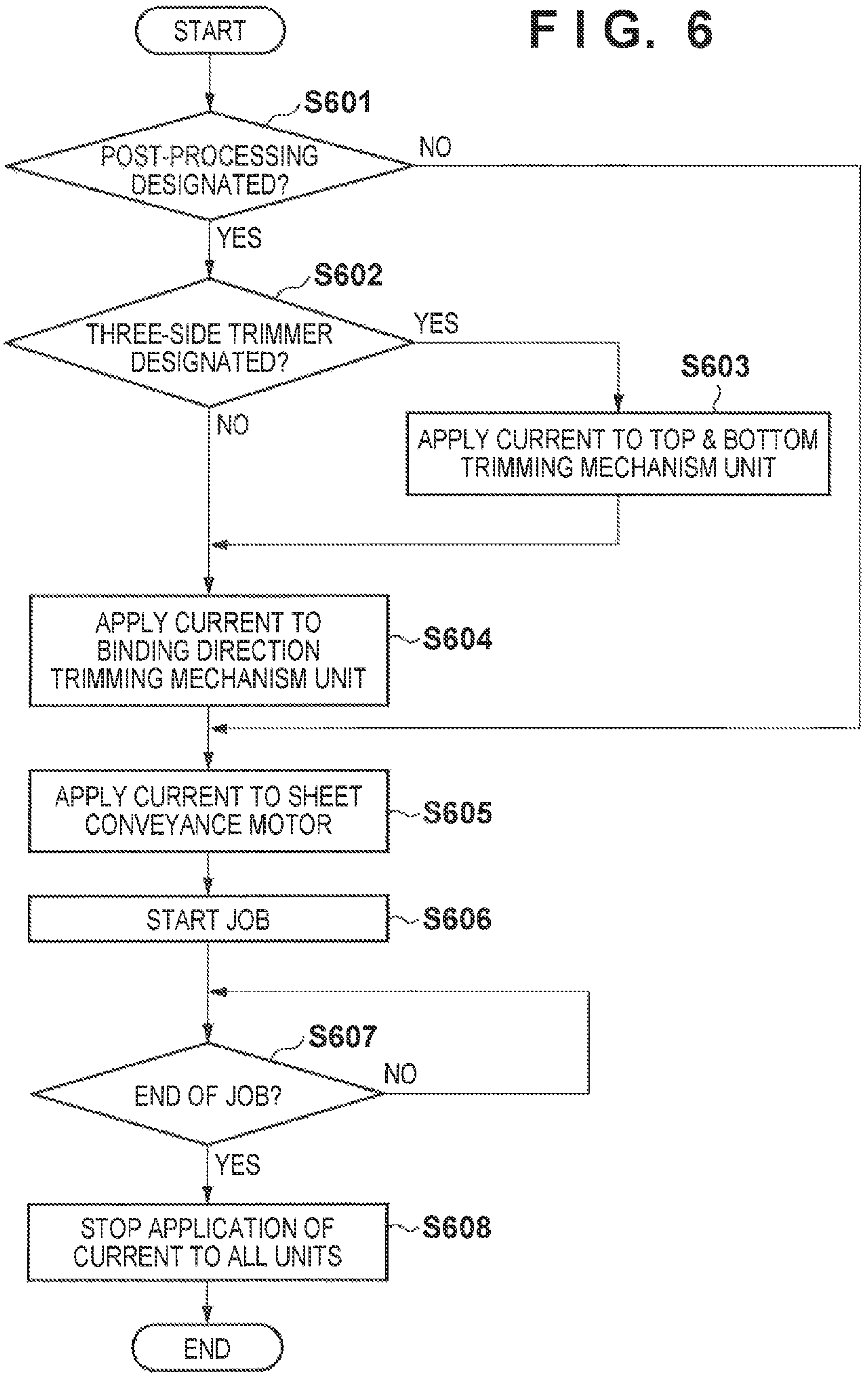
FIG. 6 is a flowchart showing a power saving sequence in the first embodiment.

Power saving control in the trimmer 440 as an example of the post-processing unit will be explained with reference to FIG. 6. Note that the following processing is performed by reading out a program stored in the HDD 142 to the RAM 140 and executing it by the controller 102. When restricting power supply to a post-processing unit, power supply to each unit is restricted based on processing contents designated by a print job.

In step S601, the controller 102 determines whether post-processing by the trimmer has been designated. If the trimmer has been designated, the process advances to step S602, and the controller 102 determines trimming sides. If the controller 102 determines that trimming of sheet edges on three sides has been designated, the process advances to step S603, and the controller 102 controls to apply a current to the top & bottom trimming mechanism. The process then advances to step S604. If the controller 102 determines that trimming of sheet edges on three sides has not been designated and trimming of a sheet edge only on one side has been designated, the process advances to step S604.

In step S604, the controller 102 controls to apply a current to the binding direction trimming mechanism. Then, the process advances to step S605. In this way, when it is determined in step S602 that not three sides but only one side has been designated, the trimmer is controlled to shift to the power saving state in which it is controlled to apply a current to only the binding direction trimming mechanism in step S604.

If the controller 102 determines in step S601 that no trimmer processing has been designated, the process advances to step S605, and the controller 102 controls to apply a current to the conveyance unit, and controls the trimmer to shift to the power saving state because the trimmer is the final stage of sheet conveyance. This processing is also executed even in step S605 alter step S604. The process then advances to step S606, and the controller 102 starts the job. In step S607, the controller 102 determines whether the job has ended, and executes sheet feeding or sheet conveyance processing until the job ends. After the job ends, the process advances to step S608, and the controller 102 controls to stop power supply to all the current-applied units, shifts the trimmer to the inactive mode, and ends the process.

The operations of the remaining units will be described briefly. As for the inserter 410, if no sheet folding is designated, a current is applied to only the automatic sheet feeder 411 and sheet conveyance motor 413 without applying a current to the Z/C sheet folding device 412. As for the puncher 420 and stacker 430, if a print job does not designate corresponding processing, a current is applied to only the sheet conveyance motors 423 and 433. As for the binder 450, if a print job designates not binding but only stapling, a current is applied to the stapler 452 without applying a current to the saddle stitcher 451.

As described above, the printing apparatus analyzes the processing contents of a print job to be executed. In accordance with the analysis result, the printing apparatus individually controls each of a plurality of sheet feeding apparatuses and a plurality of post-processing apparatuses to shift to the active state in which normal power is supplied, the power saving state in which only power necessary to convey a printing medium is supplied, or the inactive state in which no power is supplied. The printing apparatus can save power by applying a current to only necessary units in accordance with the job contents in the sheet feeding unit 160 and post-processing unit 170 each including a plurality of units.

Second Embodiment

Figure 7:
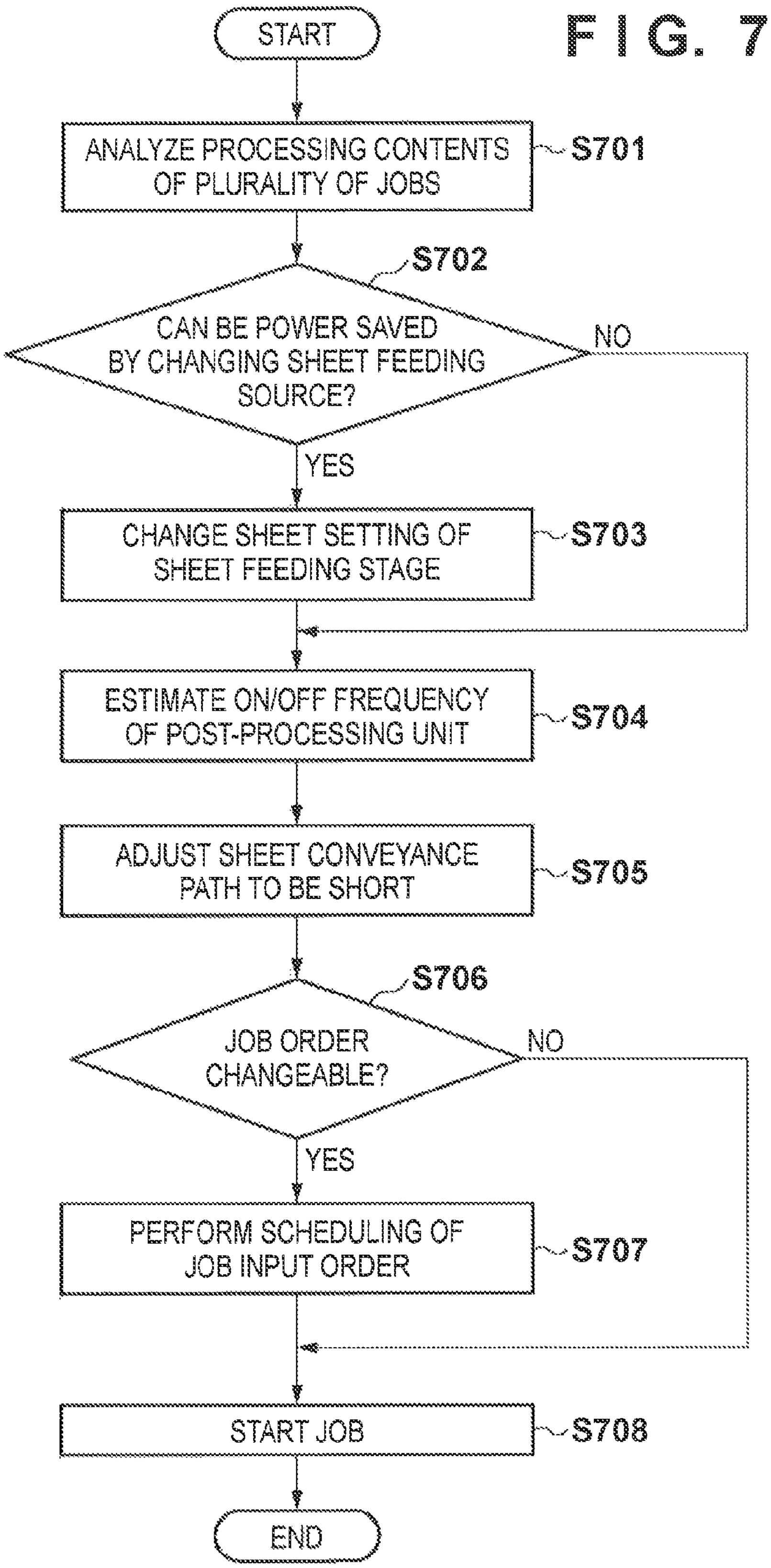
FIG. 7 is a flowchart showing a print job sequence in the second embodiment.

The second embodiment will be described with reference to FIGS. 7 and 23C. The first embodiment has explained a method of saving power within one job. In the second embodiment, when many jobs are accepted, a plurality of jobs requiring similar processes are grouped and processed, instead of processing each job.

Processing of analyzing the processing contents of a plurality of input jobs and saving power in the second embodiment will be explained with reference to FIG. 7. Note that the following processing is performed by reading out a program stored in an HDD 142 to a RAM 140 and executing it by a controller 102. To process a plurality of jobs at once, the controller 102 in the second embodiment has a job hold function.

In step S701, the controller 102 analyzes the processing contents of a plurality of jobs. In step S702, in consideration of a paper type designated by each job, the controller 102 determines whether changing the selection of the sheet feeding source has the power saving effect. If the power saving effect is obtained, the process advances to step S703, the controller 102 changes the sheet setting of the sheet feeding stage, and then the process advances to step S704. If no power saving effect is obtained, the process advances to step S704.

In step S704, the controller 102 estimates the frequency at which the power supply of the unit of a post-processing unit 170 is controlled off/on before and after the job. In step S705, the controller 102 adjusts the sheet conveyance path to be shortest for power saving of the printing system. For example, when an offline post-processing unit (not shown in FIG. 1) is to be used, the controller 102 selects, from two stackers, one which minimizes the sheet conveyance length when viewed from a sheet feeding unit 160.

In step S706, based on the job priority, the job urgency, and the results in steps S704 and S705, the controller 102 determines whether the job execution order can be changed. If the job execution order can be changed, the process advances to step S707; if NO, to step S708. Once the power supply is turned off, the accessories of the sheet feeding system, and post-processing system need to execute configuration processing to recognize again accessories connected to a printer unit 120 after the power supply is turned on next time. Some accessories require the warm-up time until they shift to the standby state. If power OFF/ON is repeated so frequently, a downtime is generated in every power OFF/ON operation, decreasing the productivity of print processing. To prevent this, in step S707, the controller 102 performs scheduling to change the print job execution order so as to reduce the generation number of switching from OFF (inactive state) to ON (active state). After that, the process advances to step S708. In step S708, the controller 102 starts the job and ends the process.

Figure 23A:
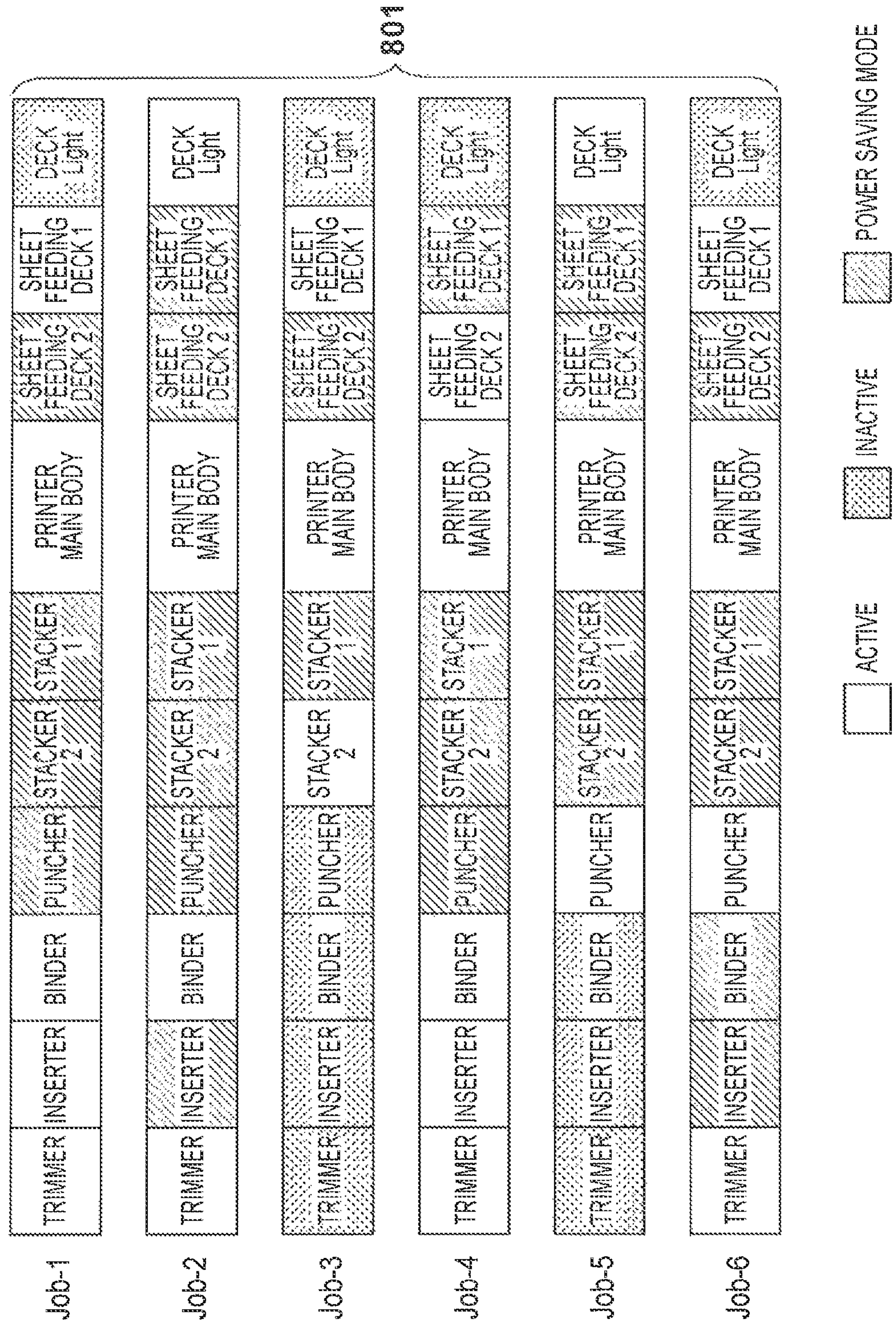
Figure 23B:
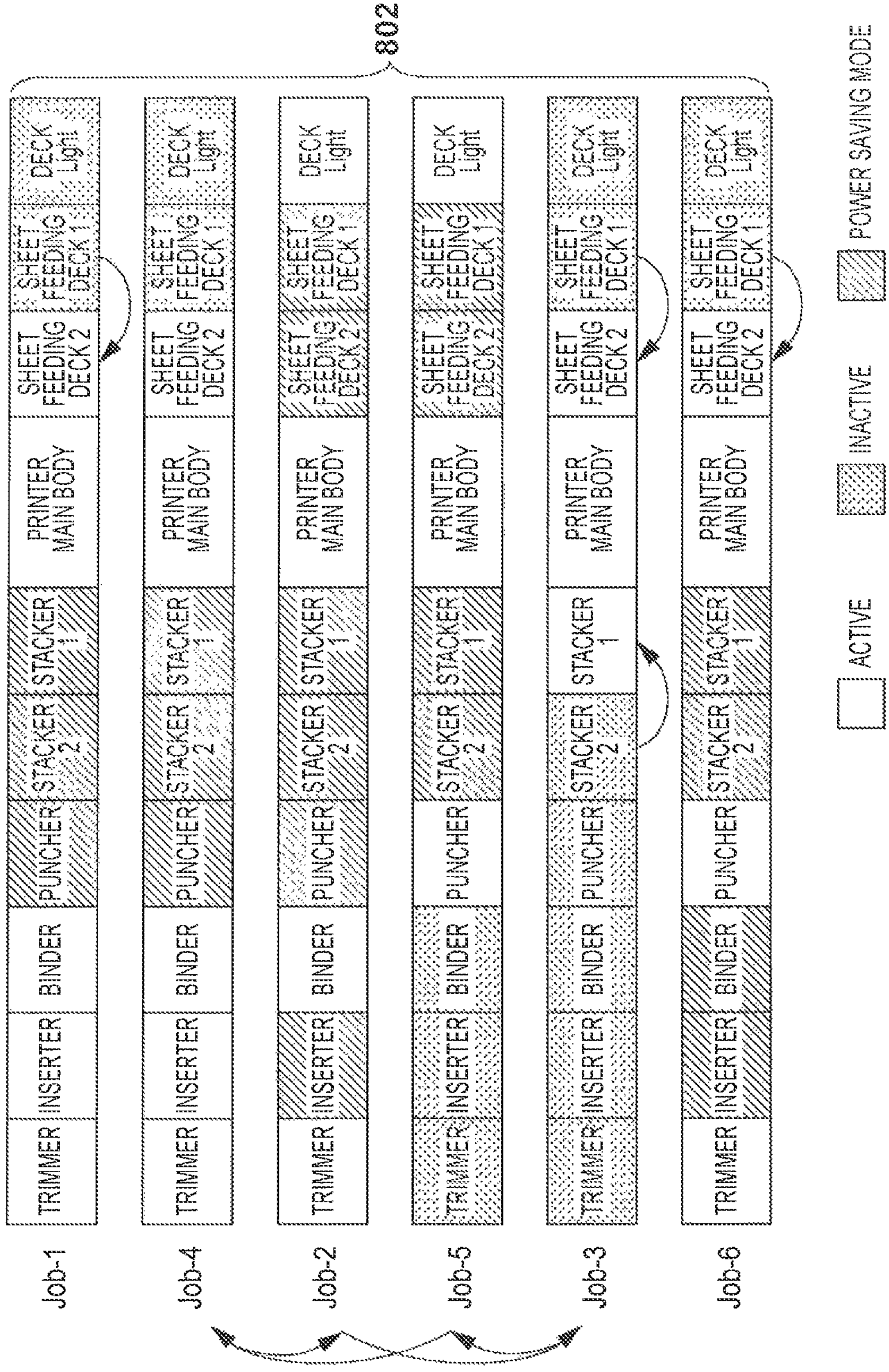

FIGS. 23A to 23C are views for explaining the effect of scheduling described with reference to FIG. 7. In 801 and 802, assume that a sheet is conveyed from the rightmost deck Light toward the leftmost trimmer. A frame indicating the active state represents that normal power is supplied to the unit. A frame indicating the inactive state represents that no power is supplied to the unit. A frame indicating the power saving state represents that only power necessary to convey a sheet is supplied.

In 801, a PC 131 in FIG. 1 transfers print jobs in the order of Job-1 to Job-6. In 802, power saving control in the second embodiment is applied to print jobs. In 802, the sheet feeding source is changed from Deck 1 to Deck 2 for Job-1, Job-3, and Job-6 to minimize the sheet conveyance length. Also, the order of Job-2, Job-3, Job-4, and Job-5 is changed to decrease the OFF/ON control count of each of the units of the sheet feeding system and post-processing system.

A table 803 shows the result of comparing power states of each unit before and after executing power saving control according to the second embodiment. The number of units in the power saving state decreases after taking the measure. However, the number of units in the inactive state increases after taking the measure, so the MFP 101 saves power more efficiently.

Third Embodiment

<Configuration of Printing System>

Figure 8A:
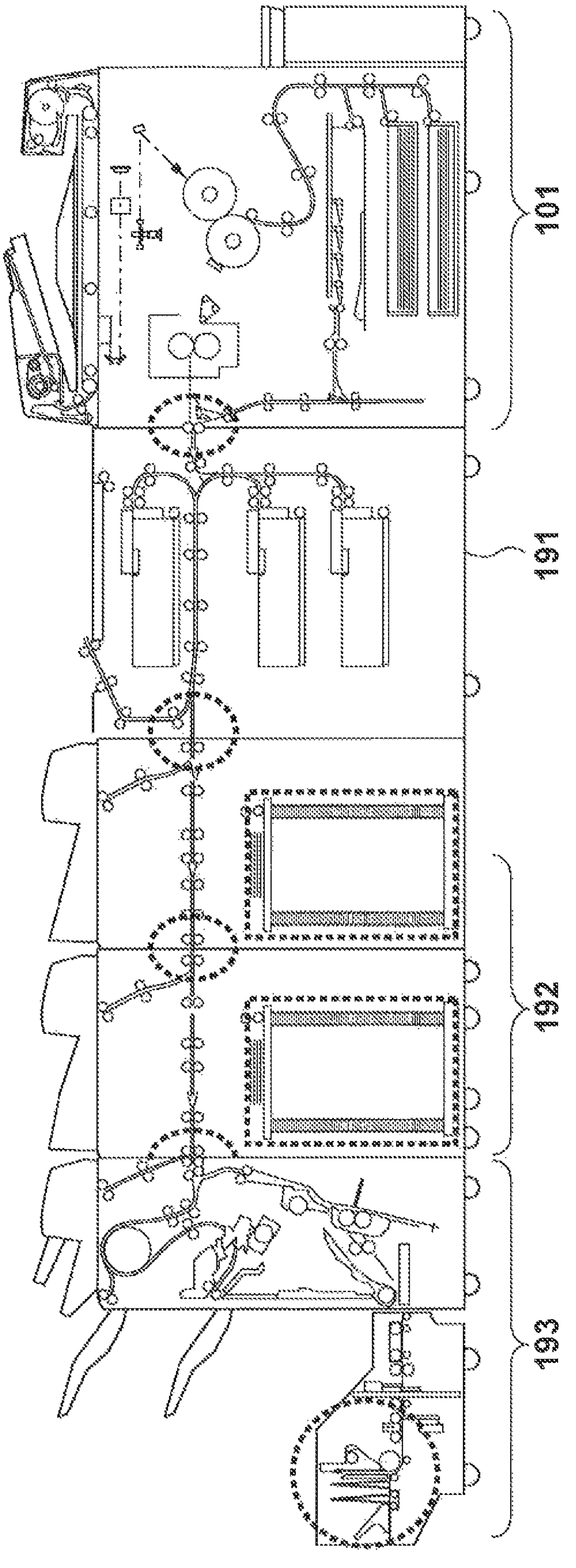
FIG. 8A is a view showing the configuration of a system in the third embodiment.

The third embodiment will be described below with reference to FIGS. 8A to 20. In the first and second embodiments, a common power supply supplies power to respective units. In the third embodiment, individual power supplies supply power to respective units. First, the configuration of a printing system in the present invention will be exemplified with reference to FIG. 8A. The printing system includes, for example, a printing apparatus 101, an inserter 191, a plurality of large-volume stackers 192, and a saddle stitching apparatus 193. The printing apparatus 101 is an MFP (Multi Function Peripheral) serving as an example of a printing apparatus including a controller 102 which generates an image, and a printer 114. As shown in FIG. 8A, in the printing system, the inserter 191, large-volume stackers 192, and saddle stitching apparatus 193 serving as post-processing apparatuses are connected to the printing apparatus 101 in the order named. Note that the connection of these post-processing apparatuses is merely an example, does not limit the present invention, and may include another order or another post-processing apparatus. In this manner, a plurality of post-processing apparatuses can be connected to the printing apparatus 101.

The inserter 191 includes a plurality of inserter trays for stacking sheets. A sheet on the inserter tray is conveyed to the large-volume stacker without the mediacy of the printing apparatus 101. The large-volume stacker 192 is a sheet processing apparatus capable of stacking a large number of sheets from the printing apparatus 101 and inserter 191. The saddle stitching apparatus 193 is a sheet processing apparatus capable of selectively executing stapling, punching, trimming, shift discharge, saddle stitching, and folding for sheets conveyed from the large-volume stacker 192.

<Control Configuration>

The control configuration of the printing system will be explained with reference to FIG. 8B. The MFP 101 is connected to a PC 131 via a network such as a LAN 130. In addition to the controller 102 and printer 114, the MFP 101 includes a network I/F 119, display device 150, input device 151, scanner 152, RAM 140, HDD control unit 141, and HDD 142.

The network I/F 119 receives print data and the like generated by a printer driver 132 of the host PC 131. The controller 102 includes a CPU 103, hard renderer 110, image processing unit 112, and printer engine control unit 113. An interpreter 104 of the CPU 103 interprets the page description language (PDL) of the received print data, generating intermediate language data 105. The hard renderer 110 generates a raster image 111 from the generated intermediate language data 105. The image processing unit 112 performs image processing for the raster image 111 or an image scanned by the scanner 152. The printer engine control unit 113 receives a status from the printer 114 (to be described later), and issues commands such as activation and sheet conveyance. The RAM 140 is a memory used as the work area of the CPU 103. The HDD control unit 141 controls to store a document file and the raster image 111 in the HDD. The HDD 142 stores document data. Control data 106 is information about the sheet count, the size of paper (printing medium), the type of paper medium, and the settings of finishers (post-processing apparatuses) used in post-processing steps, which are set by the user via the driver 132. The control data 106 is stored in the HDD 142, and can be read out from the HDD 142 by the CPU 103, as needed.

The printer 114 connected to the controller 102 is a printer which forms output data on a sheet using color toners of cyan, magenta, yellow, black, and the like. The printer 114 has a function of forming an image on a sheet, and can be connected to a sheet feeding unit 160 which feeds a sheet, and a post-processing unit 170 which performs a processing step (to be described later) for output sheets. As sheet feeding decks, the sheet feeding unit 160 includes a sheet feeding deck Light 161, and sheet feeding decks 162 and 163. A plurality of sheet feeding apparatuses can be connected, as the sheet feeding unit 160 so that a POD printing apparatus can print using a large volume of sheets, and sheets of various sizes and types can be fed.

An accessory control unit 126 functions as a power supply control means, and is driven by power converted by an AC/DC converter 125 (to be described later). A control line 122 performs power feeding ON/OFF command control to units within the accessories of the sheet feeding unit and post-processing unit based on control signals from the controller 102. That is, the control line 122 is a line for controlling whether to supply power from a power supply arranged for each apparatus to the apparatus. The AC/DC converter 125 reduces a voltage from a power supply 116 to a small value to drive the CPU 103 and the like.

The post-processing unit 170 includes a binder 174 which performs saddle stitching-processing for printed sheets, a puncher 173 which forms binding holes, an inserter 171 which inserts a slip sheet, and a trimmer 175 which trims sheet edges. A stacker 172 is an apparatus for temporarily stacking printed sheets to perform a post-processing step by a dedicated offline apparatus (not shown). These post-processing apparatuses are series-connected to the MFP 101. In the example shown in FIG. 8B, sheet feeding apparatuses are connected in the order of the sheet feeding deck Light 161, sheet feeding deck 162, and sheet feeding deck 163 from the vicinity of the MFP 101. Also, post-processing apparatuses are connected in the order of the inserter, stacker 2, stacker 1, puncher, binder, and trimmer from the vicinity of the MFP 101. The MFP 101 can feed a sheet from one of these sheet feeding apparatuses, print on the fed sheet by the printer 114, and supply the printed sheet to one of these post-processing apparatuses.

The display device 150 displays a user interface screen representing an instruction to the user and the status of the MFP 101. The scanner 152 is a scanner including an auto document feeder. The scanner 152 irradiates the images of a document bundle or the image of one document sheet with a light source (not shown), forms the document reflected image on a solid-state image sensor such as a CCD sensor via a lens, and obtains a raster image reading signal as image data from the solid-state image sensor. The input device 151 is an interface including key inputs and a touch panel for accepting an input from the user.

<Arrangement of Sheet Feeding Deck>

The internal arrangement of the sheet feeding deck 162 in the sheet feeding unit 160 will be described with reference to FIG. 9. Reference numeral 902 denotes an AC power feeding line extending from the outside; and 903, a voltage converter. A low-voltage controller 904 is a control unit which communicates with the accessory control unit 126 in FIG. 8B. Reference numeral 901 denotes a control line for the low-voltage controller 904. The following units are driven by a high voltage. A relay 905 is turned off/on by a power supply relay control unit in the controller 904. Reference numeral 906 denotes an overcurrent protection fuse; 907, a cassette heater; 908, an air sheet feeding unit; and 909, a pickup motor. A sheet conveyance motor 910 is used to rotate a roller for conveying a sheet. Relays identical to the relay 905 are connected to the respective units 908 to 910.

<Arrangement of Inserter>

Figure 10:
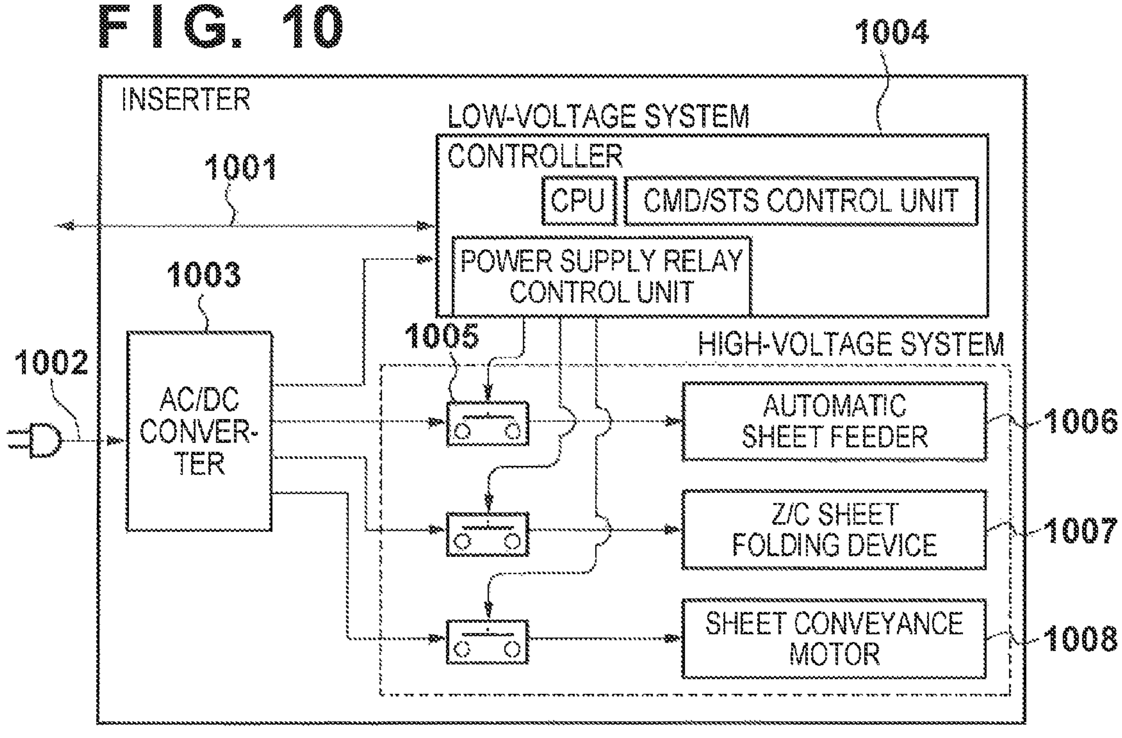
FIG. 10 is a diagram showing the arrangement of a unit in the third embodiment.

The internal arrangement of the inserter 171 in the post-processing unit 170 will be described with reference to FIG. 10. Reference numeral 1002 denotes an AC power feeding line extending from the outside; and 1003, a voltage converter. A controller 1004 is driven by a low-voltage power supply, and is a control unit which performs serial communication to receive commands from the CPU 103 and accessory control unit 126 and send back a status. The controller 1004 is formed from the control unit of a power supply relay 1005 (to be described later). Units 1006 to 1008 are driven by a high-voltage power supply. Reference numeral 1006 denotes an automatic sheet feeder; 1007, a sheet folding device which folds a longitudinal sheet in two or three; and 1008, a sheet conveyance motor. Relays identical to the relay 1005 are connected to the respective units 1006 to 1008, and the above-mentioned power supply relay control unit controls the OFF/ON states of the relays.

<Arrangement of Large-Volume Stacker>

Figure 11:
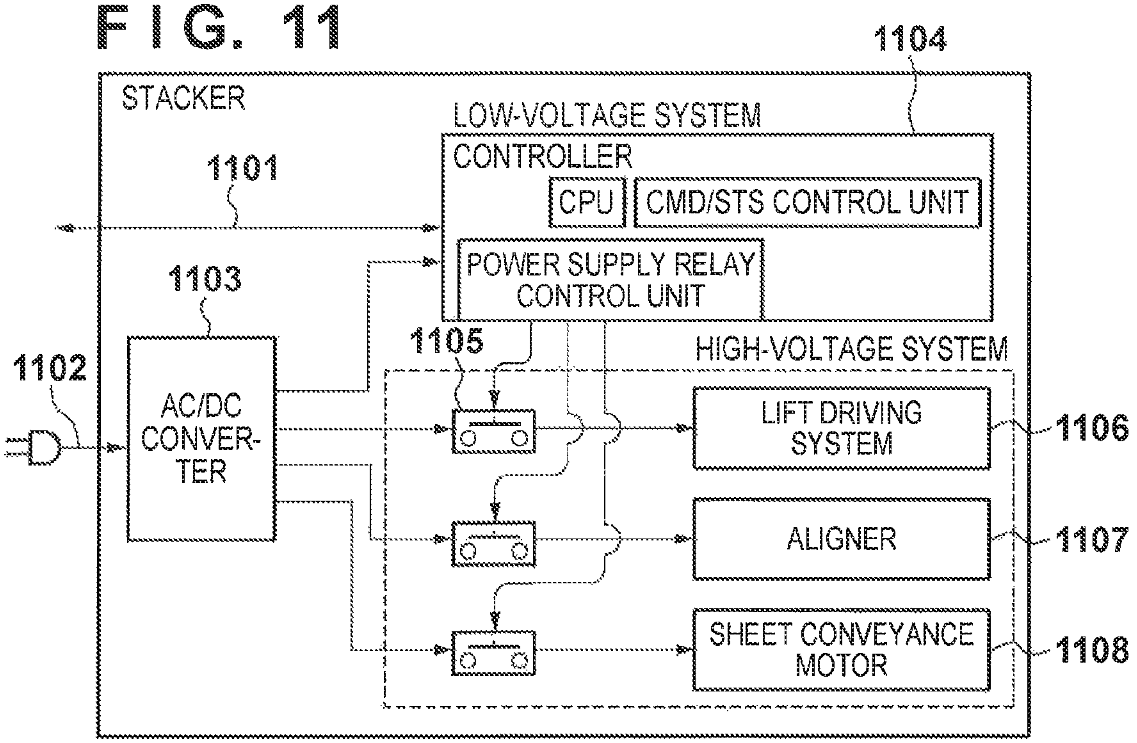
FIG. 11 is a diagram showing the arrangement of a unit in the third embodiment.

The internal arrangement of the stacker 172 in the post-processing unit 170 will be described with reference to FIG. 11. Reference numeral 1102 denotes an AC power feeding line extending from the outside; and 1103, a voltage converter. A controller 1104 is driven by a low-voltage power supply, and is a control unit which performs serial communication to receive commands from the CPU 103 and accessory control unit 126 and send back a status. The controller 1004 is formed from the control unit of a power supply relay 1105 (to be described later). Units 1106 to 1108 are driven by a high-voltage power supply. Reference numeral 1106 denotes a driving system for lifting up stacked sheets to easily take them out; 1107, an aligner which aligns the edge positions of sheets; and 1108, a sheet conveyance motor. Relays identical to the relay 1105 are connected to the respective units 1106 to 1108, and the above-mentioned power supply relay control unit controls the OFF/ON states of the relays.

<Arrangement of Puncher>

Figure 12:
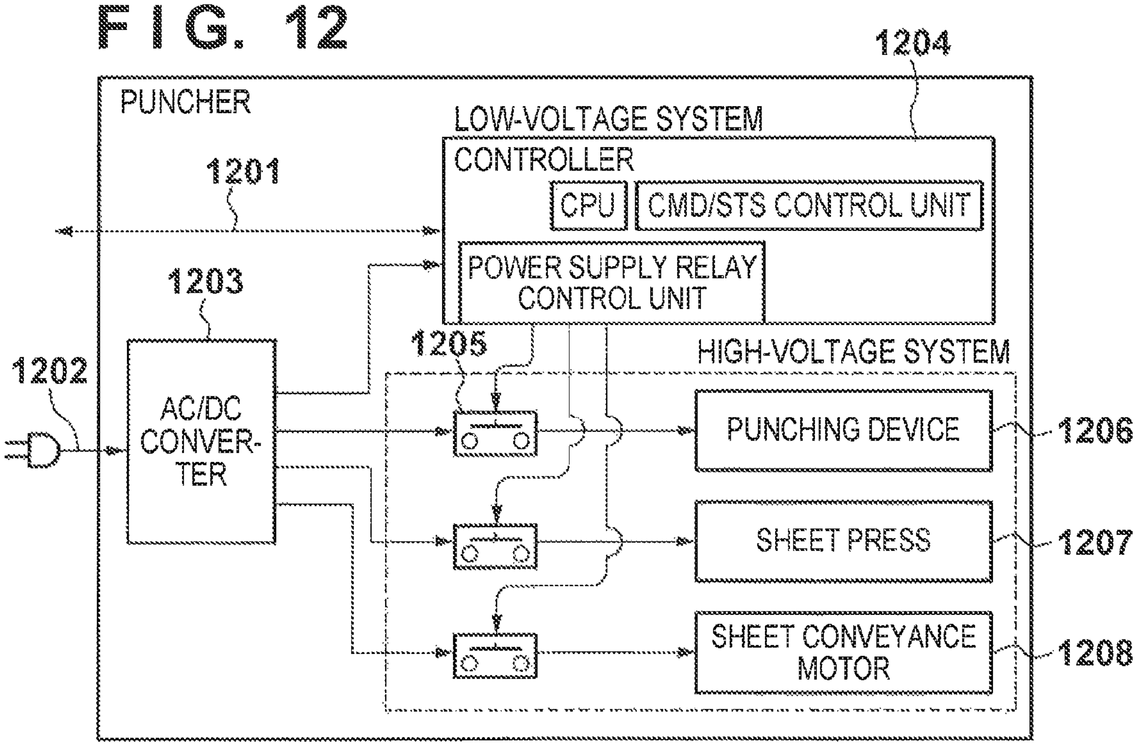
FIG. 12 is a diagram showing the arrangement of a unit in the third embodiment.

The internal arrangement of the puncher 173 in the post-processing unit 170 will be described with reference to FIG. 12. Reference numeral 1202 denotes an AC power feeding line extending from the outside; and 1203, a voltage converter. A controller 1204 is driven by a low-voltage power supply, and is a control unit which performs serial communication to receive commands from the CPU 103 and accessory control unit 126 and send back a status. The controller 1204 is formed from the control unit of a power supply relay 1205 (to be described later). Units 1206 to 1208 are driven by a high-voltage power supply. Reference numeral 1206 denotes a punching device which forms a punch hole; 1207, a sheet press; and 1208, a sheet conveyance motor. Relays identical to the relay 1205 are connected to the respective units 1206 to 1208, and the above-described power supply relay control unit controls the OFF/ON states of the relays.

<Arrangement of Trimmer>

Figure 13:
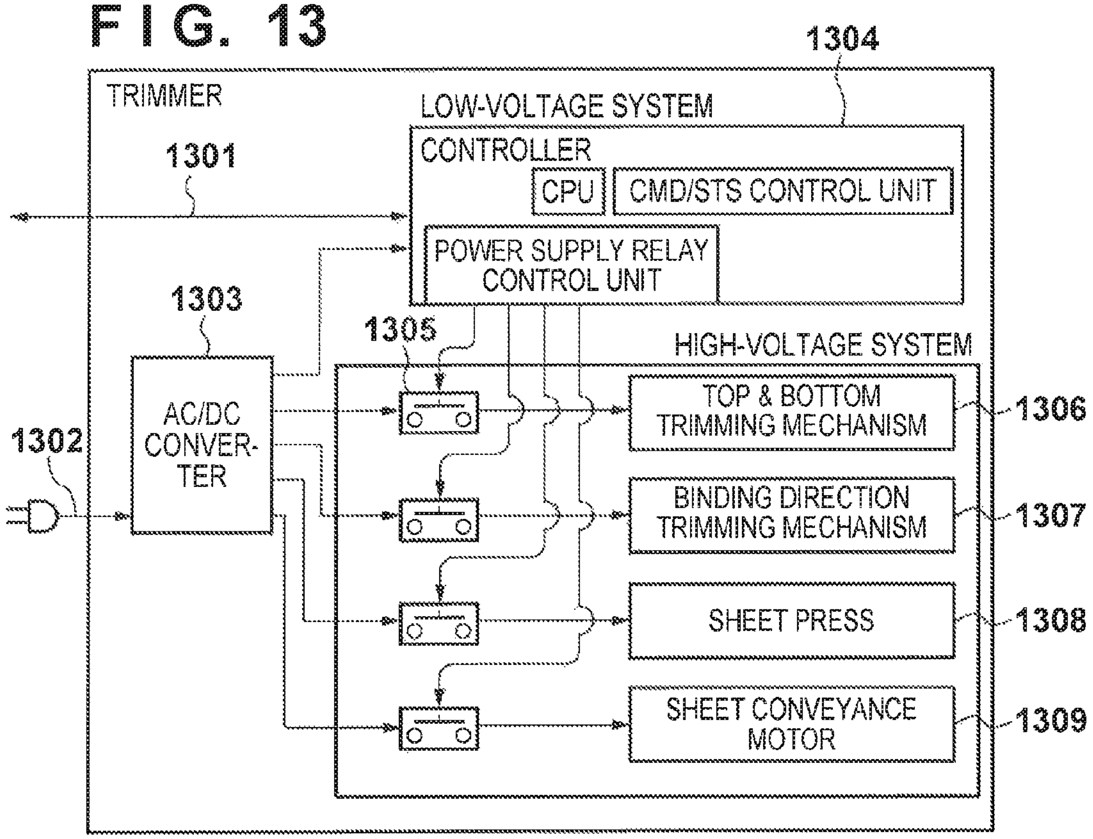
FIG. 13 is a diagram showing the arrangement of a unit in the third embodiment.

The internal arrangement of the trimmer 175 in the post-processing unit 170 will be described with reference to FIG. 13. Reference numeral 1302 denotes an AC power feeding line extending from the outside; and 1303, a voltage converter. A controller 1304 is driven by a low-voltage power supply, and is a control unit which performs serial communication to receive commands from the CPU 103 and accessory control unit 126 and send back a status. The controller 1304 is formed from the control unit of a power supply relay 1305 (to be described later). Units 1306 to 1309 are driven by a high-voltage power supply. Reference numeral 1306 denotes a trimmer on two, top and bottom sides; 1307, a trimmer in the binding direction; 1308, a sheet press; and 1309, a sheet conveyance motor. Relays identical to the relay 1305 are connected to the respective units 1306 to 1309, and the above-described power supply relay control unit controls the OFF/ON states of the relays.

<Arrangement of Binder>

Figure 14:
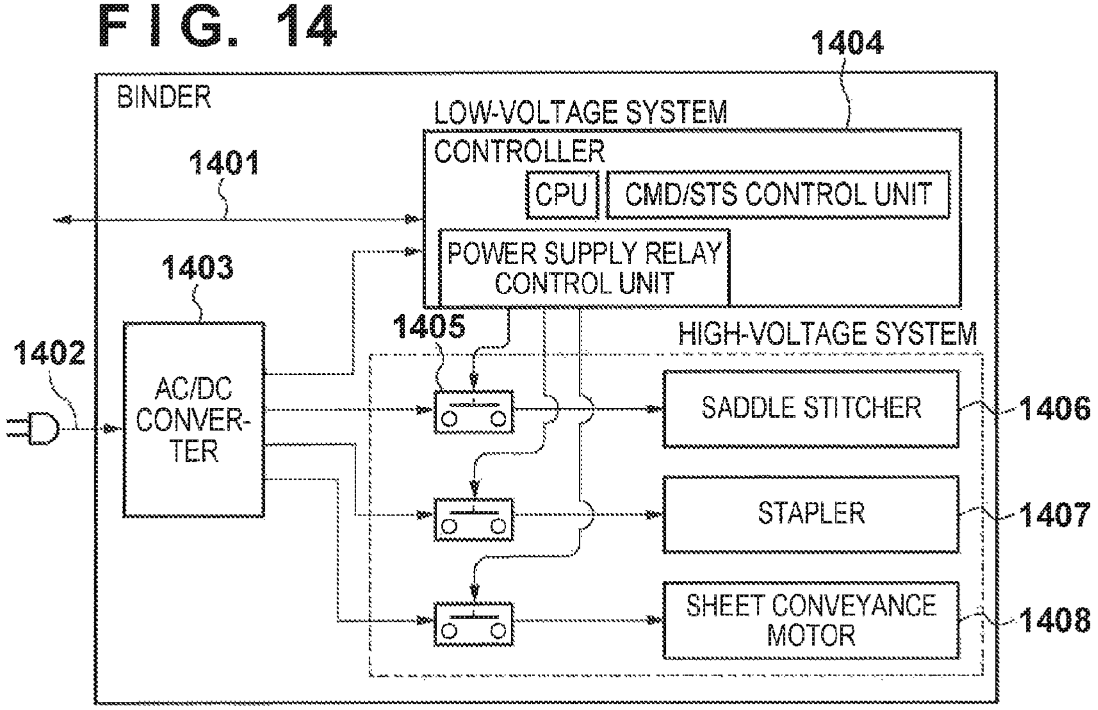
FIG. 14 is a diagram showing the arrangement of a unit in the third embodiment.

The internal arrangement of the binder 174 in the post-processing unit 170 will be described with reference to FIG. 14. Reference numeral 1402 denotes an AC power feeding line extending from the outside; and 1403, a voltage converter. A controller 1404 is driven by a low-voltage power supply, and is a control unit which performs serial communication to receive commands from the CPU 103 and accessory control unit 126 and send back a status. The controller 1404 is formed from the control unit of a power supply relay 1405 (to be described later). Units 1406 to 1408 are driven by a high-voltage power supply. Reference numeral 1406 denotes a saddle stitcher; 1407, a stapler which binds sheets with U-shaped metal fittings; and 1408, a sheet conveyance motor. Relays identical to the relay 1405 are connected to the respective units 1406 to 1408, and the above-described power supply relay control unit controls the OFF/ON states of the relays.

<Print Processing>

Figure 15:
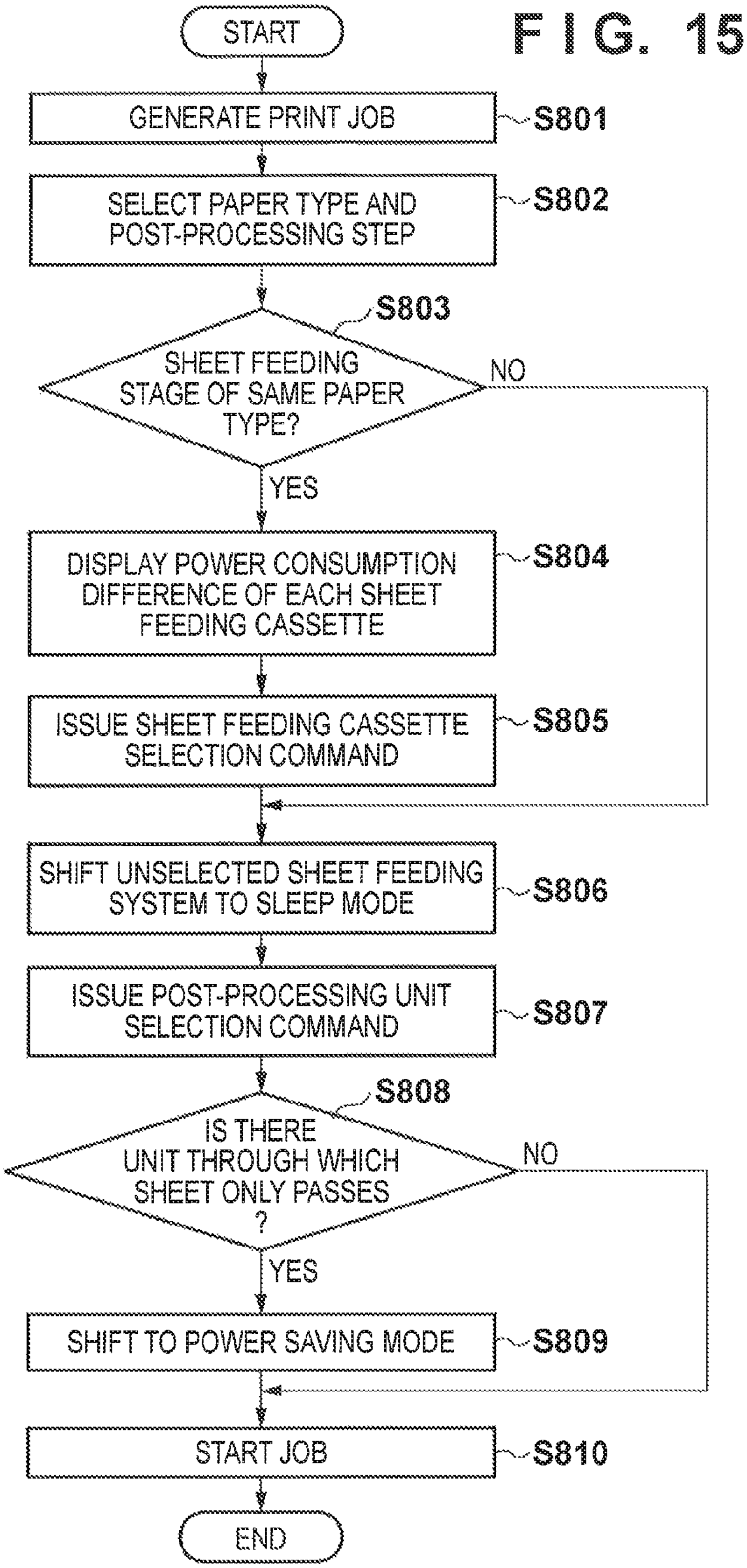
FIG. 15 is a flowchart showing a print job sequence in the third embodiment.

A sequence when the PC 131 executes print processing using the driver 132 in the system of the embodiment will be explained with reference to FIG. 15. Note that the following processing is performed by reading out a program stored in the HDD 142 to the RAM 140 and executing it by the controller 102 of the MFP 101.

When the driver 132 in the PC 131 transfers data, the controller 102 generates a print job in step S801. In step S802, the controller 102 analyzes the processing contents of the accepted print job, and selects a paper type used for printing (sheet feeding stage for feeding a sheet) and a post-processing step. The paper type means the size and type of paper. In step S803, the controller 102 determines whether the sheet feeding unit 160 includes a sheet feeding apparatus including a sheet feeding deck on which sheets of the same paper type as that selected in step S802 are stacked. If there is a sheet feeding apparatus including a sheet feeding deck on which sheets of the same paper type as the selected one are stacked, the process advances to step S804.

In step S804, the controller 102 assumes the difference value of power consumption on the premise that a sheet is fed from each sheet feeding deck, and displays the difference value on the display device 150 to the operator. Details of the display contents will be described later with reference to FIG. 20. In step S805, the controller 102 receives a sheet feeding deck selection instruction from the operator via the display device 150, and controls the accessory control unit 126 to issue a command to select, based on the contents of the selection instruction, an optimum sheet feeding deck capable of saving power. Then, the process advances to step S806. When there is only one sheet feeding deck on which sheets of the same paper type as that used by the print job are stacked, the display in step S804 and the selection in step S805 may be skipped. If the controller 102 determines in step S803 that there is no sheet feeding deck set to store sheets of the same paper type as the selected one, the processes in steps S804 and S805 are skipped and the process advances to step S806.

In step S806, the controller 102 instructs the controller 904 of the sheet feeding deck to stop supply from an internal high-voltage power supply to an unselected sheet feeding deck. In the sheet feeding deck of FIG. 9, the controller 904 turns off the relay 905 not to feed power to the cassette heater 907, air sheet feeding unit 908, and pickup motor 909. If the sheet conveyance path includes the sheet feeding deck, power is fed to only the sheet conveyance motor 910 to perform only sheet conveyance. If the sheet conveyance path does not include the sheet feeding deck, the relay is turned off not to feed power even to the sheet conveyance motor 910.

Figure 8B:
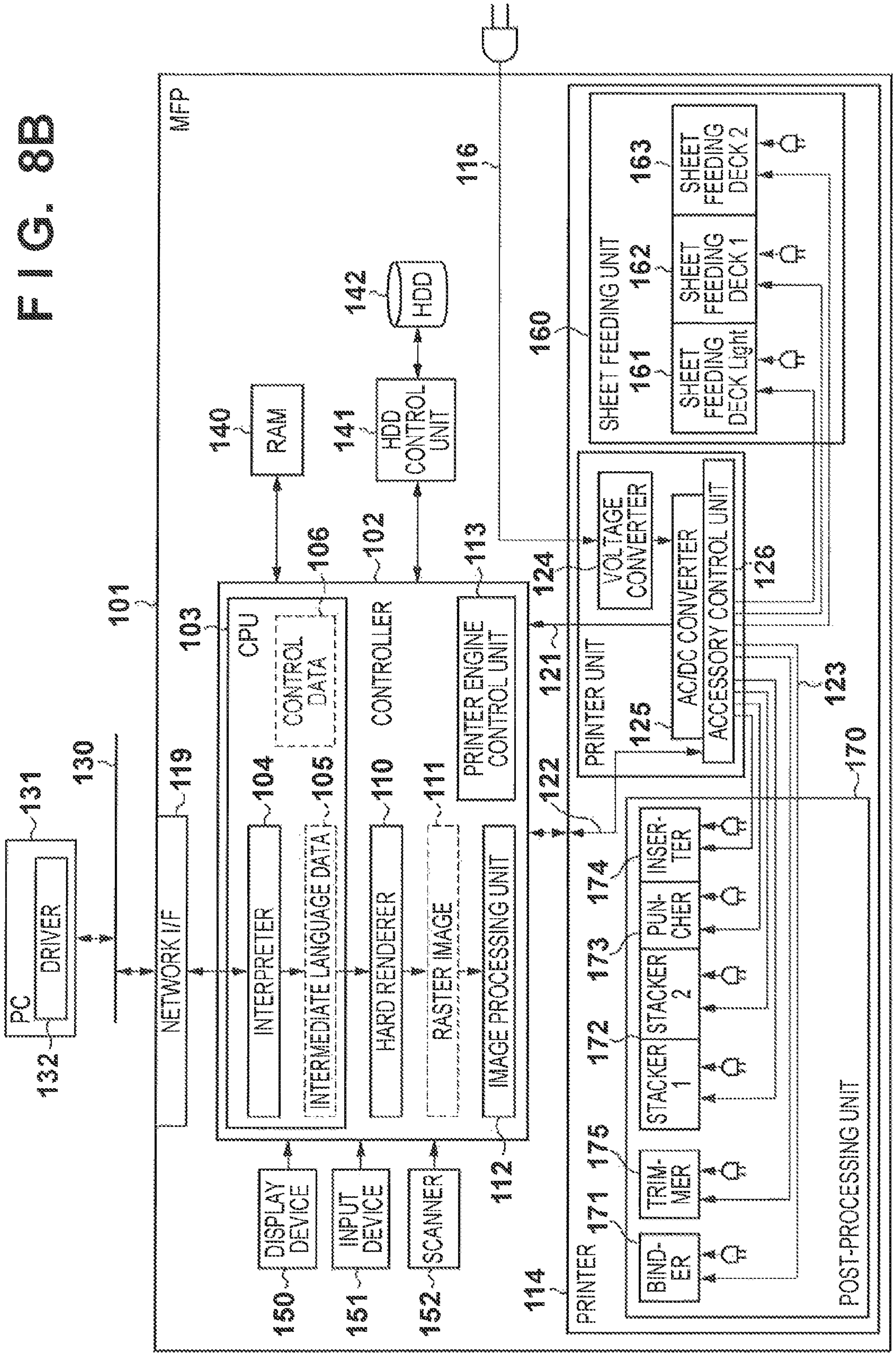
FIG. 8B is a block diagram showing the control configuration of the system in the third embodiment.

For example, assume that sheet feeding from the sheet feeding deck 163 farthest from the MFP 101 is selected when three sheet feeding decks are connected, as shown in FIG. 8B. In this case, to convey the sheet to the MFP 101, motors for rotating the conveyance rollers of the sheet feeding deck Light 161 and sheet feeding deck 162 need to be driven. In this case, only power necessary to convey a sheet is supplied to the sheet feeding deck Light 161 and sheet feeding deck 162. When sheet feeding from the closest sheet feeding deck Light 161 is selected based on the connection order of the respective sheet feeding decks to the MFP 101, only the sheet feeding deck Light 161 suffices to be operated to convey the sheet to the MFP 101. Thus, no power is supplied to the sheet feeding decks 162 and 163. That is, the sheet feeding decks 162 and 163 become inactive.

In step S807, the controller 102 selects a unit for use in the post-processing unit 170 in accordance with post-processing designated by the print job. In step S808, the controller 102 determines whether there is a unit through which a sheet only passes. If there is a unit through which a sheet only passes, the process advances to step S809, and the controller 102 shifts the unit to the power saving mode (to be described later) and starts the job in step S810. If the controller 102 determines in step S808 to use all functions included in the post-processing unit 170, it simply starts the job in step S810 without any processing.

<Power Saving Control of Sheet Feeding Unit>

Figure 16:
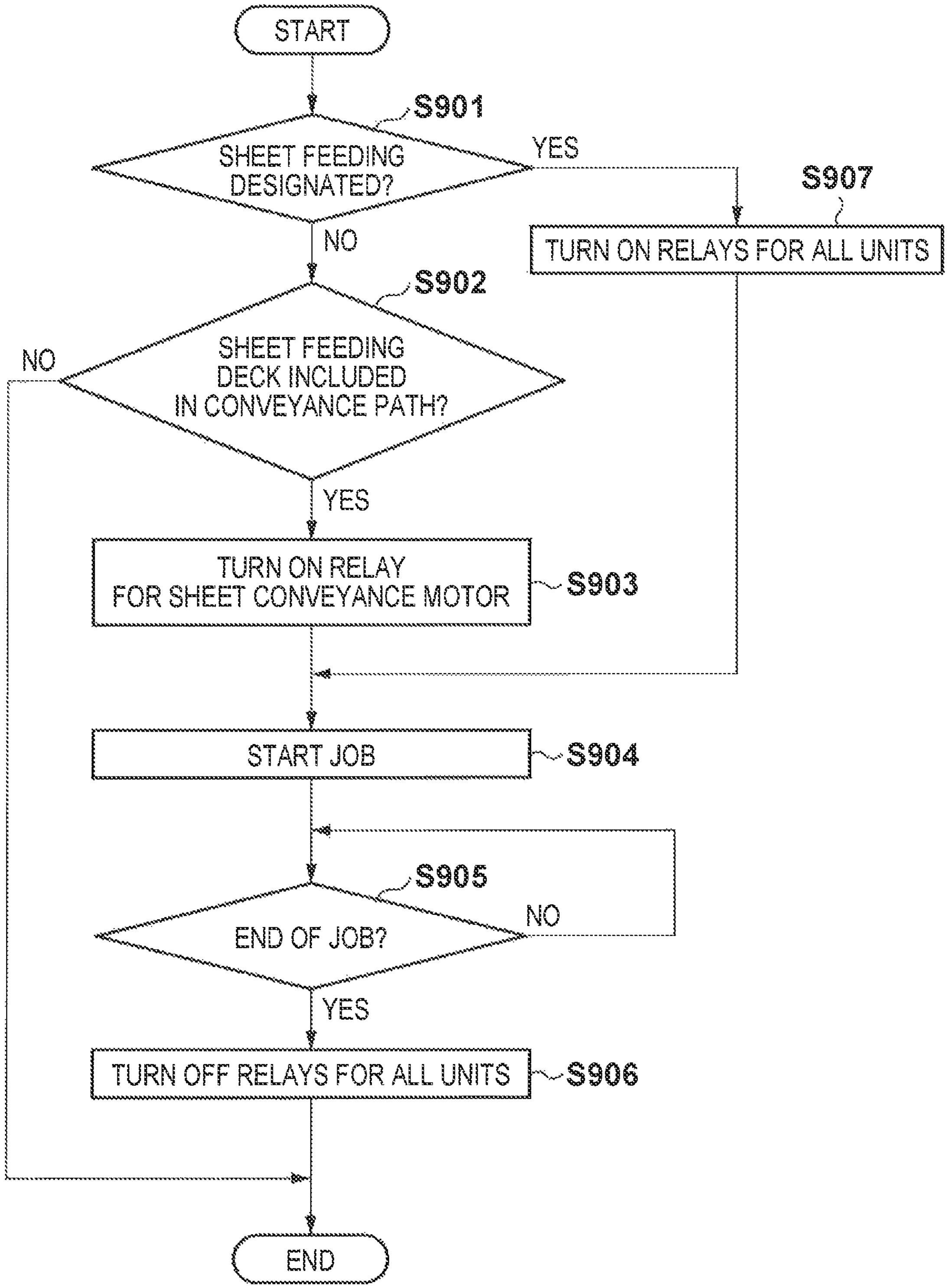
FIG. 16 is a flowchart showing a power saving sequence in the third embodiment.

Power saving control of the sheet feeding unit will be explained with reference to FIG. 16. Note that the following processing is performed by reading out a program stored in the HDD 142 to the RAM 140 and executing it by the controller 102. The controller performs the processing shown in the flowchart of FIG. 16 for each sheet feeding apparatus.

In step S901, the controller 102 determines whether sheets of a paper type selected by a print job exist in the sheet feeding deck and the sheet feeding deck has been selected. If the sheet feeding deck has been selected, the process advances to step S907, and the controller 102 shifts the sheet feeding deck to the normal operation mode in which it is controlled to turn on relays for applying a current to all the units of the sheet feeding deck. The process then advances to step S904.

If the sheet feeding deck has not been selected, the process advances to step S902, and the controller 102 determines whether the sheet feeding apparatus exists midway along the conveyance path, that is, the conveyance path includes the sheet feeding deck. If the path includes the sheet feeding deck, the process advances to step S903, and the controller 102 shifts the sheet feeding apparatus to the power saving mode in which it is controlled to turn on a relay for applying a current to only the sheet conveyance motor of the sheet feeding apparatus. After that, the process advances to step S904. If the controller 102 determines in step S902 that the path does not include the sheet feeding deck, it ends the process without turning on any relay for applying a current to a unit in the sheet feeding unit.

In step S904, the controller 102 starts the job. In step S905, the controller 102 determines whether the job has ended, and executes sheet feeding or sheet conveyance processing until the job ends. After the job ends, the process advances to step S906, and the controller 102 controls to turn off relays for feeding power to all the current-applied units, shifts the sheet feeding apparatus to the inactive mode (sleep mode), and ends the process.

The controller 102 repeats this processing for each sheet feeding apparatus.

<Power Saving Control of Trimmer>

Figure 17:
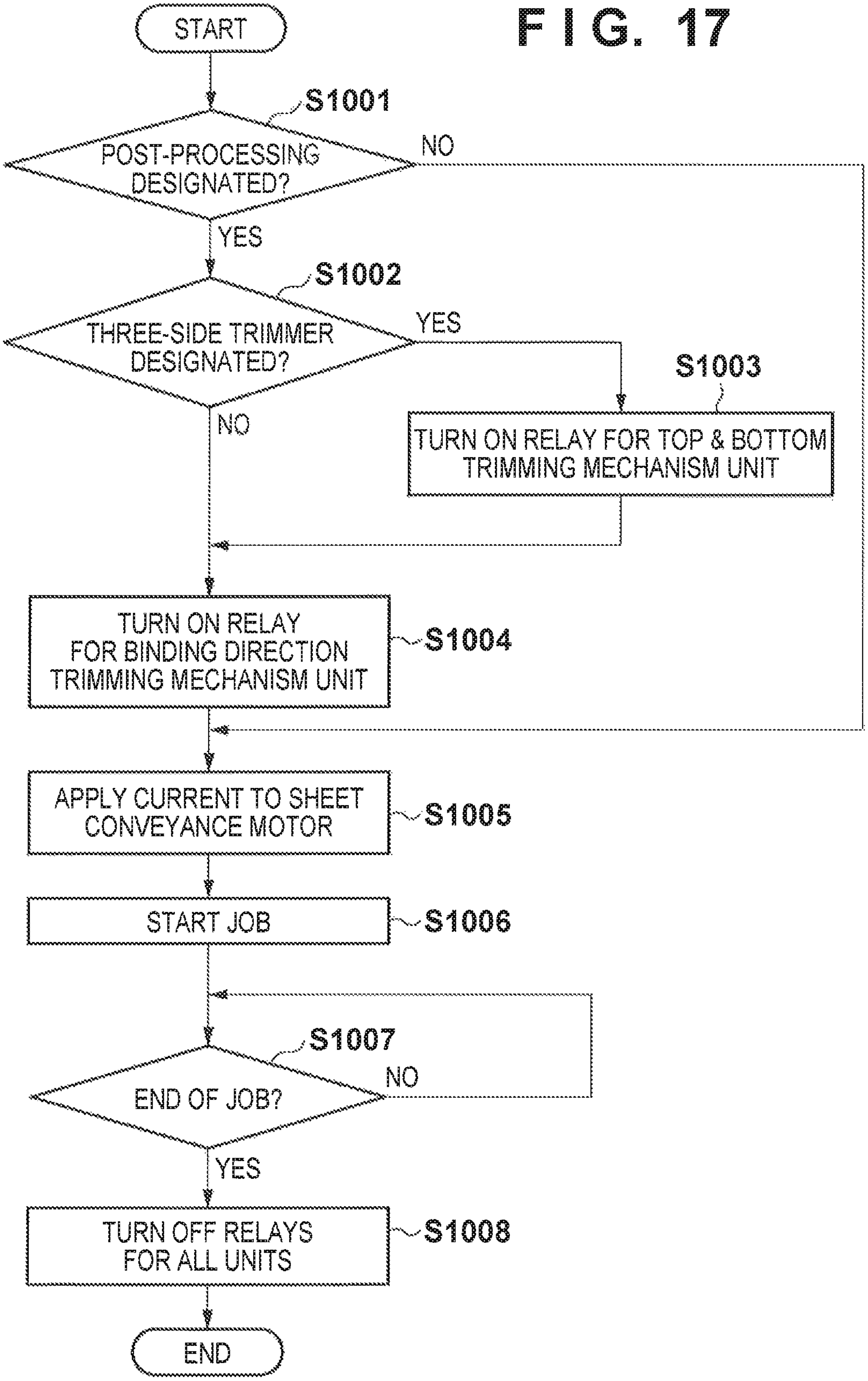
FIG. 17 is a flowchart showing a power saving sequence in the third embodiment.

Power saving control in the trimmer 175 as an example of the post-processing unit will be explained with reference to FIG. 17. Note that the following processing is performed by reading out a program stored in the HDD 142 to the RAM 140 and executing it by the controller 102. When restricting power supply to a post-processing unit, power supply to each unit is restricted based on processing contents designated by a print job.

In step S1001, the controller 102 determines whether post-processing by the trimmer has been designated. If the trimmer has been designated, the process advances to step S1002, and the controller 102 determines trimming sides. If the controller 102 determines that trimming of sheet edges on three sides has been designated, the process advances to step S1003, and the controller 102 controls to turn on a relay for applying a current to the top & bottom trimming mechanism. The process then advances to step S1004. If the controller 102 determines that trimming of sheet edges on three sides has not been designated and trimming of a sheet edge only on one side has been designated, the process advances to step S1004.

In step S1004, the controller 102 controls to turn on a relay for applying a current to the binding direction trimming mechanism. Then, the process advances to step S1005. In this fashion, when it is determined in step S1002 that not three sides but only one side has been designated, the trimmer is controlled to shift to the power saving state in which it is controlled to turn on a relay for applying a current to only the binding direction trimming mechanism in step S1004.

If the controller 102 determines in step S1001 that no trimmer processing has been designated, the process advances to step S1005, and the controller 102 controls to turn on a relay for applying a current to the conveyance unit, and controls the trimmer to shift to the power saving state because the trimmer is the final stage of sheet conveyance. Since the trimmer is the final stage of sheet conveyance and no sheet need be conveyed to a subsequent apparatus, the controller 102 may control to turn off relays for applying a current to respective units. This processing is also executed even in step S1005 after step S1004. The process then advances to step S1006, and the controller 102 starts the job. In step S1007, the controller 102 determines whether the job has ended, and executes sheet feeding or sheet conveyance processing until the job ends. After the job ends, the process advances to step S1008, and the controller 102 controls to stop power supply to all the current-applied units, shifts the trimmer to the inactive mode, and ends the process.

The operations of the remaining units will be described briefly. As for the inserter 171, if no sheet folding has been designated, only relays for applying a current to the automatic sheet feeder 1006 and sheet conveyance motor 1008 are turned on without turning on a relay for applying a current to the Z/C sheet folding device 1007. As for the puncher 173 and stacker 172, if a print job does not designate corresponding processing, only relays for applying a current to the sheet conveyance motors 1208 and 1108 are turned on. As for the binder 174, if a print job designates not binding but only stapling, only a relay for applying a current to the stapler 1407 is turned on without turning on a relay for applying a current to the saddle stitcher 1406.

<Adorer State in Print Processing>

Figure 18:
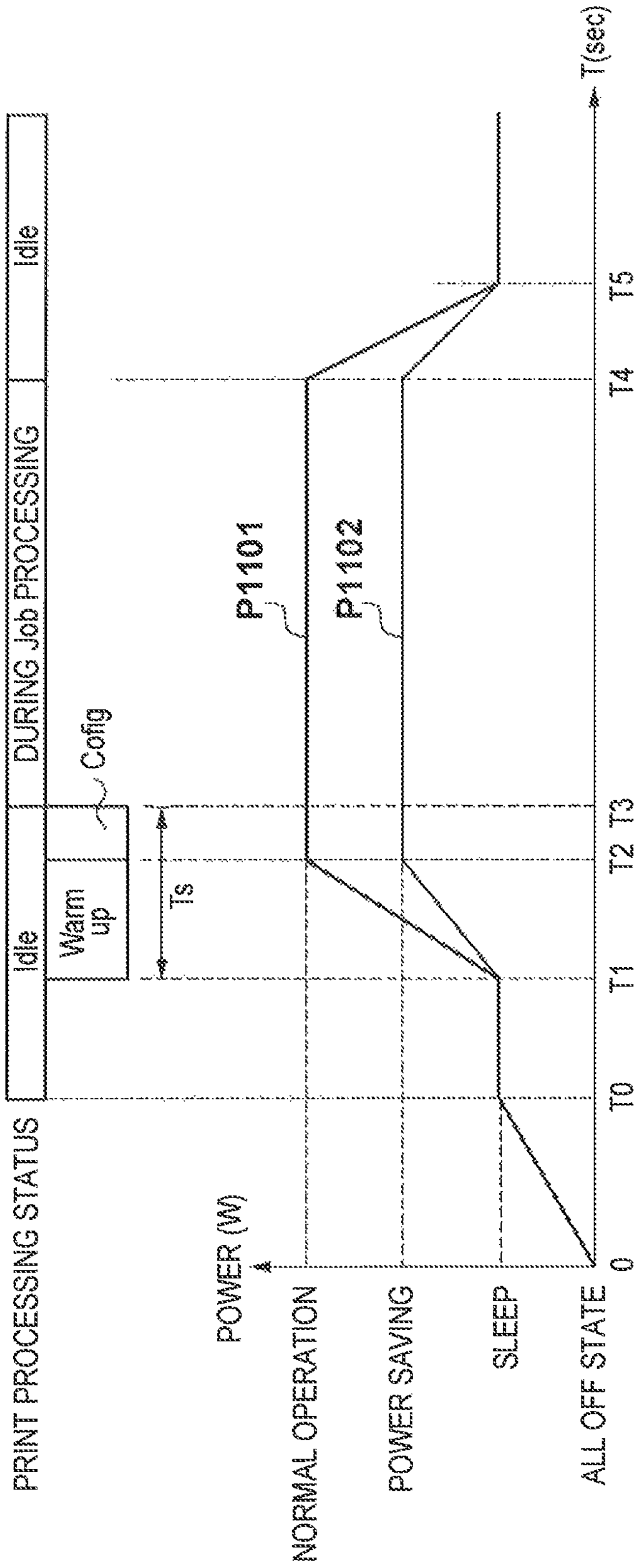
FIG. 18 is a graph showing a change of the power consumption in the third embodiment.

The relationship between the ON/OFF timings and power states of the current application relays of units in the above-described sheet feeding unit and post-processing unit, and the job processing status of the MFP 101 will be explained with, reference to FIG. 18. The ordinate indicates power (W), and the abscissa indicates the time T (sec). P1101 represents power transition in the normal operation mode, and P1102 represents power transition in the power saving mode.

The AC power supply cable of each accessory unit is connected, at T=0, and the unit shifts to the sleep mode at T0. The sheet feeding deck in FIG. 9 will be exemplified. In this state, a current is applied to the low-voltage system controller 904, and the controller 904 starts communication with the accessory control unit 126. However, the relay 905 for supplying power to a high-voltage system module has not been turned on yet and remains OFF. At T1, either a shift to the normal operation mode (P1101) in step S907 or a shift to the power saving mode (P1102) in which a relay for applying a current to only the sheet conveyance motor is turned on in step S903 is selected based on the branch condition in step S901 of FIG. 16.

Figure 9:
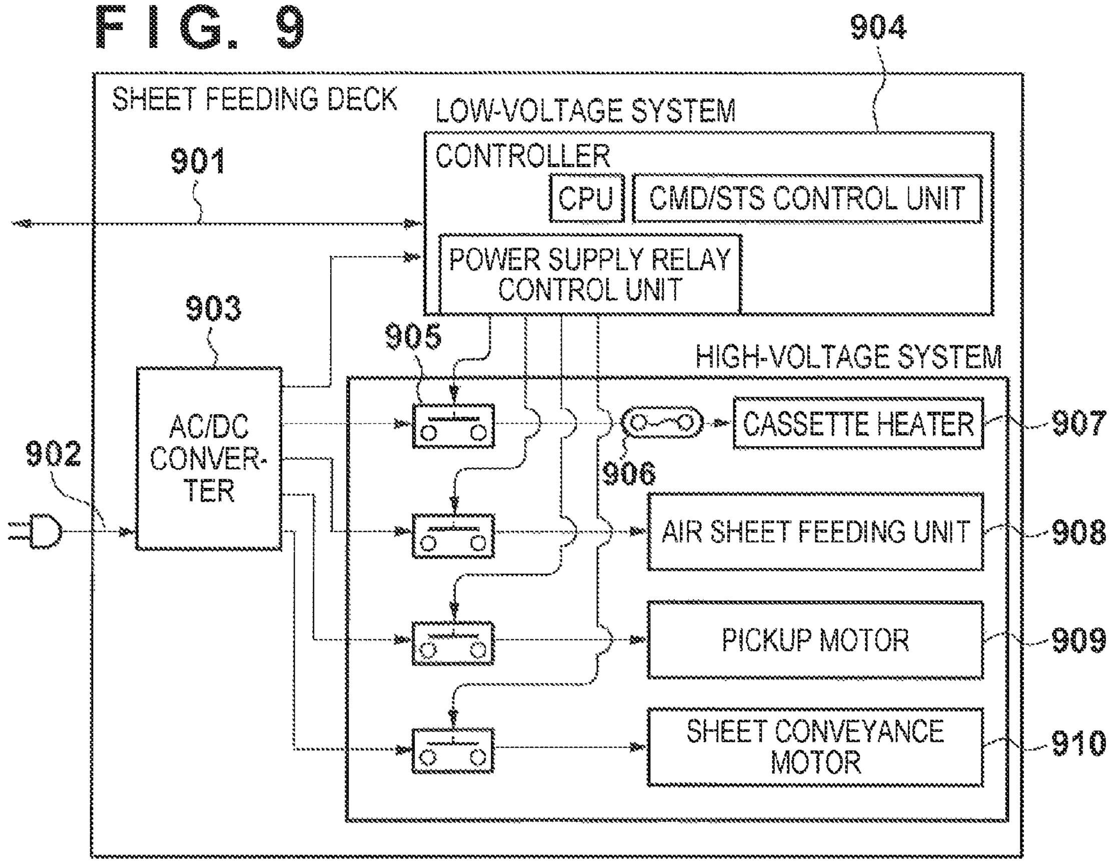
FIG. 9 is a diagram, showing the arrangement of a unit in the third embodiment.

The sheet feeding deck in FIG. 9 will be exemplified. In P1101, all relays for feeding a current to the cassette heater 907, air sheet feeding unit 908, pickup motor 909, and sheet conveyance motor 910 are turned on. In P1102, a relay for feeding a current to the sheet conveyance motor 910 is turned on while keeping OFF relays for feeding a current to the cassette heater 907, air sheet feeding unit 908, and pickup motor 909.

A module selected in the period between T1 and T2 is warmed up, and communication between the module and the accessory control unit 126 starts to perform configuration (Config) for initialization in the period between T2 and T3. In the ready state at T3, the job starts in step S904. When the job ends at T4, all relays are turned off as described in step S906 regardless of P1101 or P1102. If charges to the load of each unit are removed naturally and power drops, the unit shifts to the sleep mode at T5. In the embodiment, the unit automatically shifts to the sleep mode upon the end of the job for power saving.

<Power Consumption when Each Sheet Feeding Beck is Used>

The electric energy when the power consumption difference of each sheet feeding deck is predicted and displayed as described in step S804 will be exemplified with reference to FIG. 19. In case 0 of FIG. 19, all the accessories of the sheet feeding system are in the normal operation state. In case 1, a sheet is fed from the sheet feeding deck Light 161, and the sheet feeding decks 162 and 163 are in the power saving mode in which only the mechanism of the sheet conveyance system is ON. In case 2, a sheet, is fed from the sheet feeding deck 162, the sheet feeding deck Light 161 is in the sleep mode, and the sheet feeding deck 163 is in the power saving mode in which only a relay for feeding power to the mechanism of the sheet conveyance system is ON. In case 3, a sheet is fed from the sheet feeding deck 163, and the sheet feeding deck Light 161 and sheet feeding deck 162 are in the sleep mode.

As shown in FIG. 19, case 0 requires a highest power consumption of 1,800 W, and case 3 requires a lowest power consumption of 600 W. This is because the sheet feeding deck 163 is closest to the conveyance path among a plurality of sheet feeding decks and no power need be fed to the mechanisms of the sheet conveyance systems of the remaining sheet feeding decks. In other words, when only the sheet feeding deck 163 is used, the remaining sheet feeding decks shift to the sleep mode and do not require power feeding.

<Example of Display>

An example in which the power consumption difference of each sheet feeding deck is predicted and displayed on the display device 150 in the above-described step S804 will be explained with reference to FIG. 20. FIG. 20 shows power reduction values when a sheet feeding cassette in the sheet feeding deck 162 is selected and when a sheet feeding cassette in the sheet feeding deck 163 is selected, compared to selecting a sheet in the sheet feeding deck Light 161. More specifically, the display device 150 displays a message indicating that using the sheet feeding deck 162 will expect a 100-W energy saving effect and using the sheet feeding deck 163 will expect a 200-W energy saving effect, compared to using the sheet feeding deck Light 161. In this manner, the MFP 101 according to the embodiment presents information as described above, and the user can easily select a sheet by taking account of the energy saving effect.

As described above, the printing apparatus analyzes the processing contents of a print job to be executed. In accordance with the analysis result, the printing apparatus individually controls each of a plurality of sheet feeding apparatuses and a plurality of post-processing apparatuses to shift to the active state in which normal power is supplied, the power saving state in which only power necessary to convey a printing medium is supplied, or the inactive state in which no power is supplied. The printing apparatus can save power by applying a current to only necessary units in accordance with the lob contents in the sheet feeding unit 160 and post-processing unit 170 each including a plurality of units.

Fourth Embodiment

The fourth embodiment will be described with reference to FIGS. 21 to 23. The third embodiment has explained a method of saving power in one job. In the fourth embodiment, when many jobs are accepted, a plurality of jobs requiring similar processes are grouped and processed, instead of processing each job. In the fourth embodiment, processing of analyzing the processing contents of a plurality of input jobs and saving power will be explained with reference to the flowchart of FIG. 21.

Figure 21:
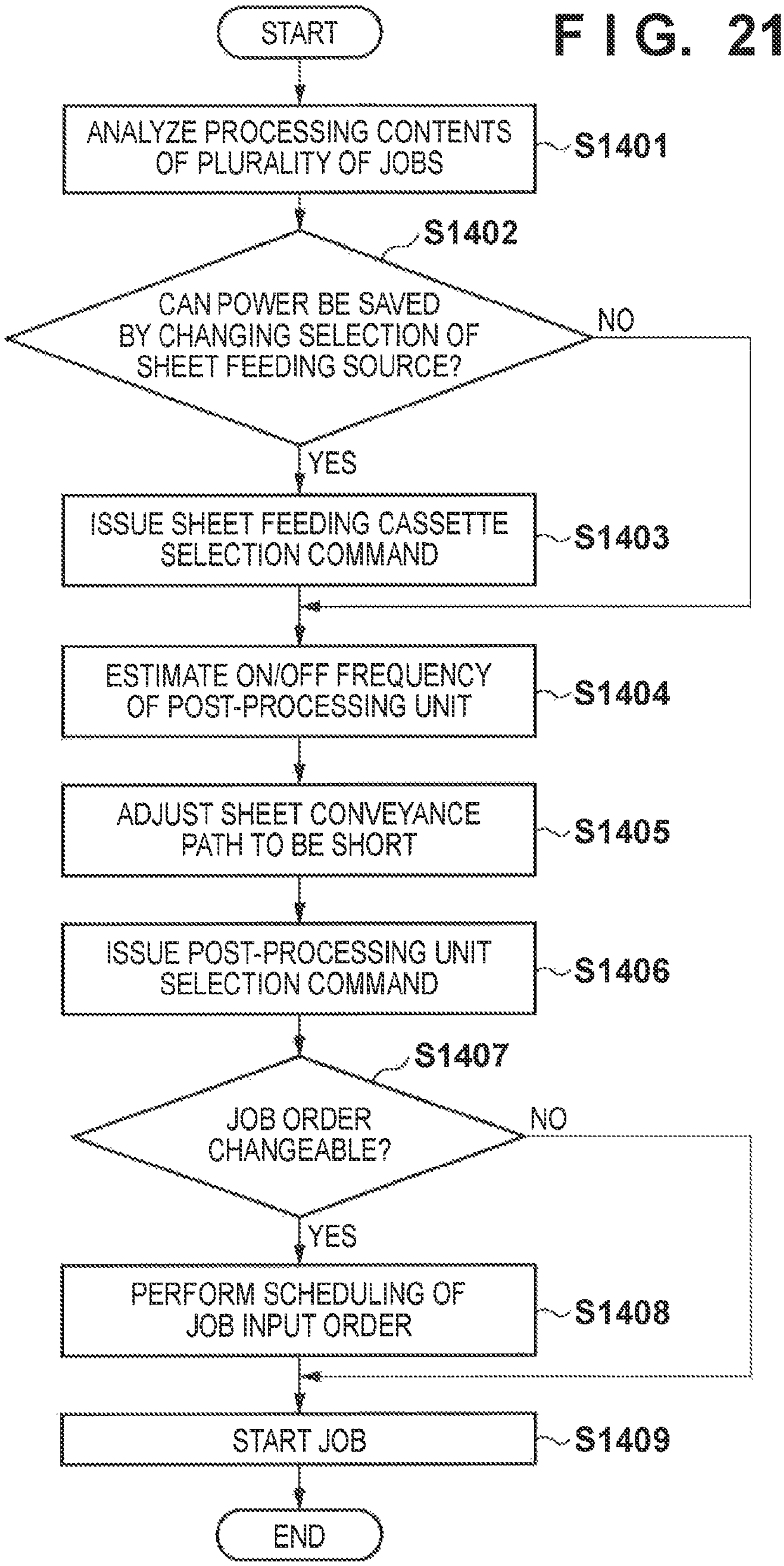
FIG. 21 is a flowchart showing a print job sequence in the fourth embodiment.
Figure 22:
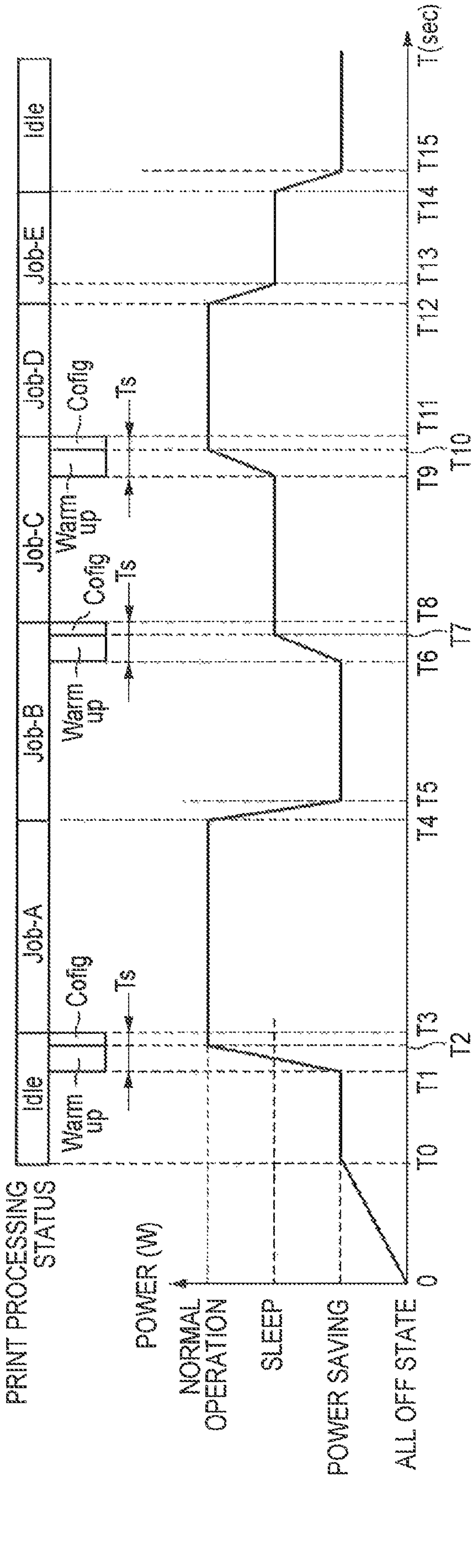
FIG. 22 is a graph showing a change of the power consumption in the fourth embodiment.

FIG. 21 shows a sequence to perform optimum power control when a plurality of print jobs are processed at once. Note that the following processing is performed by reading out a program stored in an HDD 142 to a RAM 140 and executing it by a controller 102. To process a plurality of jobs at once, the controller 102 in the fourth embodiment has a job hold function.

In step S1401, the controller 102 analyzes the processing contents of a plurality of jobs. In step S1402, in consideration of a paper type designated by each job, the controller 102 determines whether changing the selection of the sheet feeding source has the power saving effect. If the power saving effect is obtained, the process advances to step S1403, the controller 102 changes the sheet setting of the sheet feeding deck, and then the process advances to step S1404. If no power saving effect is obtained, the process advances to step S1404 without performing step S1403.

In step S1404, the controller 102 estimates the frequency at which the power supply of a post-processing unit is turned off/on before and after the job. In step S1405, the controller 102 adjusts the sheet conveyance path to be shortest for power saving of the printing system. For example, when an offline post-processing unit (not shown in FIG. 8B) is to be used, the controller 102 selects, from two stackers, one which minimizes the sheet conveyance length when viewed from the sheet feeding unit. In step S1406, the controller 102 selects a post-processing unit and issues a selection command indicating the selected post-processing unit.

In step S1407, based on the job priority, the urgency, and the results in steps S1404 and S1405, the controller 102 determines whether the job execution order can be changed. Once the power supply is turned off, the accessories of the sheet feeding system and post-processing system need to execute configuration to recognize again accessories connected to a printer unit 120 after the power supply is turned on next time. Some accessories require the warm-up time until they shift to the standby state. If power OFF/ON is repeated so frequently, a downtime is generated in every power OFF/ON operation, decreasing the productivity of print processing. To decrease the OFF/ON count, if the controller 102 determines in step S1407 that the job order can be changed, it performs scheduling to change the print job execution order so as to reduce the generation number of switching from OFF (inactive state) to ON (active state) in step S1408. In step S1409, the controller 102 starts the job.

<Power State in Print Processing>

The relationship between the ON/OFF timings and power states of the current application relays of units in the above-described sheet feeding unit and post-processing unit, and the job processing status of an MFP 101 will be explained with reference to FIG. 22. The ordinate indicates power (W), and the abscissa indicates the time T (sec). The AC power supply cable of each accessory unit is connected at T=0, and the unit shifts to the power saving mode at T0.

A trimmer 175 in FIG. 8B will be explained with reference to the flowchart of FIG. 17. At T0, a current is applied to a low-voltage system controller 1304, and the controller 1304 starts communication with an accessory control unit 126. However, a relay 1305 for supplying power to a high-voltage system module has not been turned on yet and remains OFF. At T1, it is determined in step S1002 whether a three-side trimmer has been designated. In step S1003, relays for feeding power to trimming mechanisms for all the three sides are turned on. Warm Up of each unit starts in the period between T1 and T2. In the period between T2 and T3, communication between the unit and the accessory control unit 126 starts and configuration for initialization is performed.

In the ready state at T3, processing of Job-A starts. When Job-A ends at T4, Job-B starts subsequently. Since the sheet conveyance path does not include the trimmer for Job-B, the trimmer shifts to the sleep mode in which only the low-voltage system controller 1304 is turned on. For Job-C, the three-side trimmer is included in the sheet conveyance path but is not designated. Thus, a relay for only feeding power to a sheet conveyance motor 1309 is turned on, and the trimmer operates in the power saving mode.

If the above-mentioned Warm Up and configuration time Ts for initialization follow Job-B, a downtime is generated in the apparatus. To prevent this, it is desirable to estimate the Job-B end time in advance and turn on the relay the time Ts before Job-B ends. In this case, immediately after Job-B, the unit of the post-processing unit becomes ready at T8, and processing of Job-C can start.

For Job-D, the three-side trimmer is designated. At T9 the time Ts before Job-C ends, relays for feeding power to a top & bottom trimming mechanism 1306, binding direction trimming mechanism 1307, and sheet press 1308 are turned on. At T12, Job-D ends. For Job-E, the three-side trimmer is included in the sheet conveyance path but is not designated. Thus, power is kept fed to only the sheet conveyance motor 1309, relays for feeding power to the remaining units are turned off, and the trimmer shifts to the power saving mode. Since there is no job after Job-E, a relay for feeding power to the sheet conveyance motor 1309 is turned off at T14 at which Job-E. At T15, the trimmer shifts to the sleep mode in which power is fed to only the low-voltage system controller 1304.

FIGS. 23A to 23C are a view for explaining the effect of scheduling described with reference to FIG. 21 to change the print job execution order so as to reduce the generation number of switching from OFF (inactive state) to ON (active state). In 801 and 802, assume that a sheet is conveyed from the rightmost deck Light toward the leftmost trimmer. A frame indicating the active state represents that normal power is supplied to the unit. A frame indicating the inactive state represents that no power is supplied to the unit. A frame indicating the power saving state represents that only power necessary to convey a sheet is supplied.

In 801, a PC 131 in FIG. 8B transfers print jobs in the order of Job-1 to Job-6. In 802, power saving control in the fourth embodiment is applied to print jobs. In 802, the sheet feeding source is changed, from Deck 1 to Deck 2 for Job-1, Job-3, and Job-6 to minimize the sheet conveyance length. Also, the order of Job-2, Job-3, Job-4, and Job-5 is changed to decrease the OFF/ON control count of each of the units of the sheet feeding system and post-processing system.

A table 803 shows the result of comparing power states of each unit before and after executing power saving control according to the fourth embodiment. The number of units in the power saving state decreases after taking the measure. However, the number of units in the inactive state increases after taking the measure, so the MFP 101 saves power more efficiently.

Other Embodiments

Aspects of the present, invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded, the broadest interpretation so as to encompass all such modifications and equivalent structures and functions.

This application claims the benefit of Japanese Patent Applications No. 2011-025338 filed on Feb. 8, 2011 and 2011-259507 filed on Nov. 23, 2011, which are hereby incorporated by reference herein in their entirety.

What is claimed is:

1. A printing system, comprising:

a printing apparatus which prints an image on a sheet;

a first post-processing apparatus which conveys, by a first conveying unit, the sheet conveyed from the printing apparatus, and which performs, by a first post-processing unit, post-processing on the sheet;

a second post-processing apparatus which performs, by a second post-processing unit, post-processing on the sheet; and a power supply control unit configured to, in a case where the post-processing by the second post-processing unit is performed on the sheet, control to supply power to the sheet conveying unit of the first post-processing apparatus and restrict from supplying power to the first post-processing unit of the first post-processing apparatus.

2. The apparatus according to claim 1, further comprising:

a receiving unit configured to receive a job; and a selecting unit configured to select a post-processing apparatus based on the job received by the receiving unit, wherein the power supply control unit, in a case where the post-processing apparatus selected by the selecting unit is the second post-processing apparatus, controls to supply power to the sheet conveying unit of the first post-processing apparatus and restricts from supplying power to the first post-processing unit of the first post-processing apparatus.

3. The apparatus according to claim 1, further comprising a third post-processing apparatus which performs, by a third post-processing unit, post-processing on the sheet conveyed from the second post-processing apparatus, wherein the power supply control unit, in a case where the post-processing by the second post-processing apparatus is performed on the sheet, restricts from supplying power to the third post-processing apparatus.

4. The apparatus according to claim 1, wherein the second post-processing apparatus includes a trimming apparatus which trims the sheet.

5. The apparatus according to claim 1, wherein a power supply is individually arranged for each of the printing apparatus, the first post-processing apparatus, and the second post-processing apparatus.

6. A method for controlling a printing system having a printing apparatus which prints an image on a sheet, a first post-processing apparatus which conveys, by a first conveying unit, the sheet conveyed from the printing apparatus and which performs, by a first post-processing unit, post-processing on the sheet, and a second post-processing apparatus which performs, by a second post-processing unit, post-processing on the sheet, the method comprising:

in a case where the post-processing by the second post-processing apparatus is performed on the sheet, controlling to supply power to the first sheet conveying unit of the first post-processing apparatus and restricting the supply of power to the first post-processing unit of the first post-processing apparatus.

7. A non-transitory computer-readable storage medium storing a computer program for causing a computer to execute each step of the method defined in claim 6.

8. A printing system comprising:

a first sheet storage apparatus which conveys, by a first conveying unit, a sheet from a first sheet storage unit of the first sheet storage apparatus;

a second sheet storage apparatus which conveys, by a second conveying unit, the sheet conveyed from the first sheet storage apparatus, and which heats, by a heating unit, a sheet set in a second sheet storage unit of the second sheet storage apparatus; and a power supply control unit configured to, in a case where the sheet is conveyed from the first sheet storage unit, control to supply power to the second conveying unit of the second sheet storage apparatus and restrict from supplying power to the heating unit of the second sheet storage apparatus.

* * * * *